United States Patent
Ji et al.

(10) Patent No.: US 9,081,235 B2
(45) Date of Patent: Jul. 14, 2015

(54) DISPLAY PANEL COMPRISING A BLACK MATRIX WITH A RECESSED PORTION, A COLOR FILTER HAVING A FIRST THICKNESS, AND A DUMMY COLOR FILTER HAVING A SECOND THICKNESS

(75) Inventors: Woo-Man Ji, Asan-si (KR); Cheon-Jae Maeng, Suwon-si (KR); Jang-Soo Kim, Yongin-si (KR); Sang-Ho Kim, Cheonan-si (KR)

(73) Assignee: Samsung Display Co., Ltd. (KR)

( * ) Notice: Subject to any disclaimer, the term of this patent is extended or adjusted under 35 U.S.C. 154(b) by 737 days.

(21) Appl. No.: 13/115,897

(22) Filed: May 25, 2011

(65) Prior Publication Data

US 2012/0120337 A1     May 17, 2012

(30) Foreign Application Priority Data

Nov. 15, 2010 (KR) .................. 10-2010-0113465

(51) Int. Cl.
  *G02F 1/1339* (2006.01)
  *G02F 1/1333* (2006.01)
  *G02F 1/1335* (2006.01)

(52) U.S. Cl.
  CPC ...... *G02F 1/13394* (2013.01); *G02F 1/133514* (2013.01); *G02F 1/133512* (2013.01)

(58) Field of Classification Search
  CPC .......... G02F 1/133516; G02F 1/133392; G02F 1/1341; G02F 2001/13396
  USPC .......................................... 349/110, 155–157
  See application file for complete search history.

(56) References Cited

U.S. PATENT DOCUMENTS

| 6,975,379 B2 | 12/2005 | Kim et al. | |
| 2007/0058125 A1* | 3/2007 | Yoo et al. | 349/152 |

FOREIGN PATENT DOCUMENTS

| KR | 1020030068266 A | 8/2003 |
| KR | 1020040051412 A | 6/2004 |
| KR | 1020050095718 A | 9/2005 |

* cited by examiner

*Primary Examiner* — Paul Lee
(74) *Attorney, Agent, or Firm* — Innovation Counsel LLP

(57) ABSTRACT

A display panel includes a first substrate, a second substrate and a spacer disposed there between. The second substrate includes a black matrix pattern, a color filter, a dummy color filter and a common electrode. The black matrix pattern is formed with an opening portion which is filled by the color filter. The dummy color filter is made of same material as the color filter and extends in a vertical direction along which the spacer also extends. The spacer is formed between the first substrate and the second substrate in correspondence with location of the dummy color filter so that the effective spaced apart distance that the spacer provides between the first and second substrates is a function of a thickness of the dummy color filter.

5 Claims, 18 Drawing Sheets

FIG. 11B
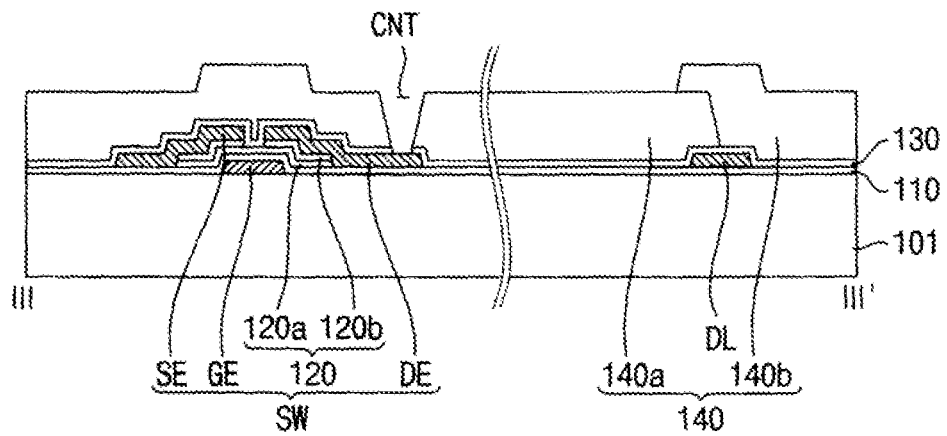
FIG. 11C
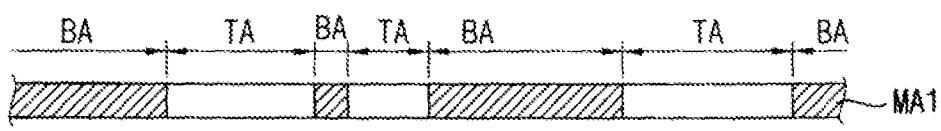
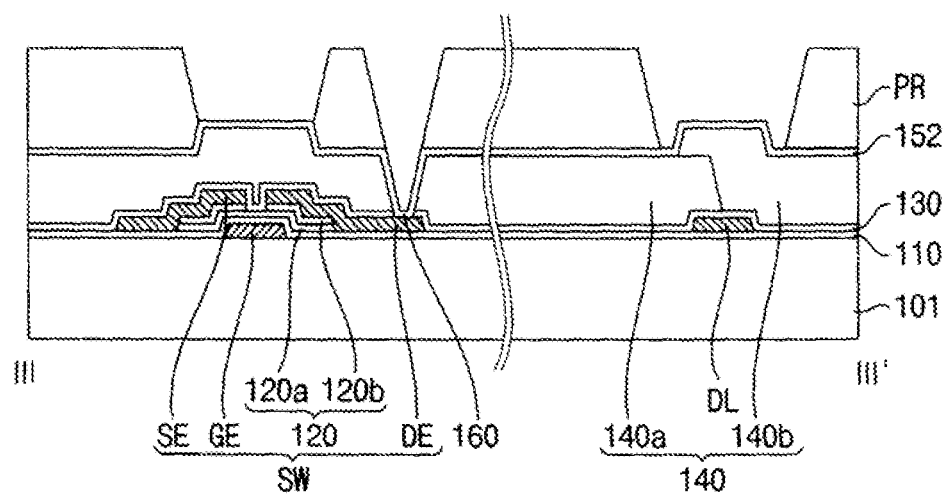

US 9,081,235 B2

DISPLAY PANEL COMPRISING A BLACK MATRIX WITH A RECESSED PORTION, A COLOR FILTER HAVING A FIRST THICKNESS, AND A DUMMY COLOR FILTER HAVING A SECOND THICKNESS

PRIORITY STATEMENT

This application claims priority under 35 U.S.C. §119 to Korean Patent Application No. 2010-113465, filed on Nov. 15, 2010 in the Korean Intellectual Property Office (KIPO), the contents of which application are herein incorporated by reference in their entirety.

BACKGROUND

1. Field of Disclosure

The present disclosure of invention relates to a flat panel display and a method of manufacturing the display panel. More particularly, example embodiments of the present disclosure relate to a display panel used in a liquid crystal display ("LCD") device and a method of manufacturing the display panel.

2. Description of Related Technology

Generally, a liquid crystal display (LCD) device includes a display panel displaying an image by using an electrically variable light transmittance of a liquid crystal material and by using a backlight assembly disposed below the display panel to provide the display panel with lights. The display panel includes a first substrate having pixel electrodes and thin-film transistors (TFTs) electrically connected to the pixel electrodes, a second substrate having a common electrode and color filters, and a liquid crystal material layer interposed between the first substrate and the second substrate.

The LCD device has various advantages over older display technologies, such as reduced thickness, being of a lighter weight, of a lower driving voltage and of a lower power consumption, etc. As a result, the LCD device is widely employed for various electronic devices such as a video monitor, a laptop computer, a cellular phone, a television set, etc.

However, since a response speed of liquid crystal molecules to an applied electric field tends to be slower than duration of one frame (i.e., a time period corresponding to one display frame), a technology which requires displaying of moving images is hard in the LCD device. Thus, in order to increase response speeds of the liquid crystal displays, a technology of decreasing a cell gap of the liquid crystal material has been developed.

However, in order to uniformly maintain a cell gap of the liquid crystal material between the first substrate and the second substrate and across all cells of a large area display, a plurality of spacers is provided between the first and second substrates. When the cell gap dimension of the liquid crystal device is decreased, a height of the spacers is also decreased. When the height of the spacers is decreased, an inkjet deposited amount of a photoresist that is normally used for forming the spacers typically also must be decreased. But such decrease in the volume of inkjet deposited photoresist is difficult to achieve and moreover, volume of ejected spacer material does not necessarily correlate well with the cured height of the deposited photoresist (PR) and thus it becomes difficult to secure a uniformity of the spacer heights when using ink-wise ejected volumes of spacer material and thus the cell gaps formed across cells of a large area display may not be uniform when inkjet ejected volumes of spacer material are used for forming spacers.

It is to be understood that this background of the technology section is intended to provide useful background for understanding the here disclosed technology and as such, the technology background section may include ideas, concepts or recognitions that were not part of what was known or appreciated by those skilled in the pertinent art prior to corresponding invention dates of subject matter disclosed herein.

SUMMARY

Example embodiments in accordance with the present disclosure of invention provide a display panel having spacers formed in a way capable of enhancing a reliability of the spacer manufacturing process and thus reliability of the display panel itself.

Example embodiments of the present disclosure also provide a method of manufacturing the above-mentioned display panel.

According to one aspect of the present disclosure, when an inkjet or alike process is used to deposit to-be-cured volumes of spacer material, the corresponding display panel is structured to include: a first substrate, a second substrate and a spacer that defines a spacing apart as between the first and second substrates. The first substrate may include a first base substrate and a pixel electrode formed on the first base substrate. The second substrate includes a second base substrate, a black matrix pattern, a common filter, a dummy color filter and a common electrode. The second base substrate is disposed opposite to the first base substrate. The black matrix pattern is formed on the second base substrate to have an opening portion formed thereon in correspondence with a pixel area. The color filter is formed in the opening portion of the black matrix pattern. The dummy color filter is formed of a same material as the color filter and with a respective thickness corresponding to a formed thickness of the color filter. The common electrode is formed on the second base substrate on which the color filter and the dummy color filter are formed. The spacer is formed between the first substrate and the second substrate in correspondence with the location of the dummy color filter so that the effective spaced apart distance between the first and second substrates is made a function of the thickness of the dummy color filter.

In an example embodiment, the dummy color filter may be formed on the black matrix pattern between the pixel areas that are spaced apart from each other, and the spacer may be formed on the common electrode to overlap with the dummy color filter.

In an example embodiment, the dummy color filter may have a width no more than about 70% of a diameter of the spacer.

In an example embodiment, a thickness of the dummy color filter may be substantially equal to that of the color filter.

In an example embodiment, the black matrix pattern may further include a recessed portion formed on an area where the dummy color filter is formed, and the spacer may be formed on an area corresponding to the recessed portion.

In an example embodiment, a thickness of the dummy color filter may be substantially thinner than that of the color filter.

According to another aspect of the present invention, a display panel includes a first substrate, a second substrate and a spacer. The first substrate includes a first base substrate, a switching element, a color filter and a pixel electrode. The switching element is formed on the first base substrate. The color filter is formed on the first base substrate on which the switching element is formed. The color filter has a first recessed portion formed on an area corresponding to the switching element. The pixel electrode is formed on the first base substrate on which the color filter is formed. The pixel electrode is electrically connected to the switching element. The second substrate includes a second base substrate and a common electrode. The second base substrate is opposite to the first base substrate. The common electrode is formed on the second base substrate. The spacer is formed between the first substrate and the second substrate in correspondence with the first recessed portion.

In an example embodiment, the first substrate may further include a passivation layer formed on the first base substrate on which the color filter is formed to have a first hole exposing the first recessed portion. The spacer may be formed on the common electrode facing the first hole.

In an example embodiment, the first substrate may further include a gate line connected to the switching element to be extended along a first direction, and a data line connected to the switching element to be extended along a second direction crossing the first direction. The color filter may further include a second recessed portion formed on an area corresponding to the data line. The passivation layer may further include a second hole exposing the second recessed portion.

According to another aspect of the present invention, there is provided a method of manufacturing a display panel. In the method, a pixel electrode is formed on a first base substrate. Then, a black matrix pattern is formed on a second base substrate to have an opening portion formed thereon in correspondence with a pixel area of the second substrate. Then, a color filter and a dummy color filter are formed on the second base substrate on which the black matrix pattern is formed. The color filter is disposed on the pixel area, and the dummy color filter connects the color filters disposed to be spaced apart from each other along one direction. The dummy color filter having a width substantially narrower than that of the color filter. Then, a common electrode is formed on the second base substrate on which the color filter and the dummy color filter are formed. Then, a spacer overlapping with the dummy color filter is formed on the second substrate on which the common electrode is formed. Then, the first base substrate and the second base substrate are coupled with each other so that the pixel electrode and the common electrode are opposite to each other.

In an example embodiment, the dummy color filter may be formed on the black matrix pattern between the pixel areas that are spaced apart from each other. The dummy color filter may have a width no more than about 70% of a diameter of the spacer.

In an example embodiment, in a formation of the color filter and the dummy color filter, a color photoresist layer may be formed on the second base substrate on which the black matrix pattern is formed. Then, a mask may be disposed on the color photoresist layer and lights are irradiated onto the mask. The mask may have a light-blocking portion corresponding to the color filter and the dummy color filter. Then, the color filter layer may be developed.

In an example embodiment, a thickness of the dummy color filter may be substantially equal to a thickness of the color filter.

In an example embodiment, in a formation of the black matrix pattern, a black matrix layer may be formed on the second base substrate. Then, the black matrix layer may be patterned to form an opening portion in correspondence with the pixel areas and a recessed portion in correspondence with the dummy color filter. The spacer may be formed on an area corresponding to the recessed portion.

In an example embodiment, in a formation of the color filter and the dummy color filter, a color photoreisist layer may be formed on the second base substrate on which the black matrix pattern is formed. Then, a mask may be disposed on the color photoresist layer and lights are irradiated onto the mask. The mask may have a light-blocking portion corresponding to the color filter and a half-transmitting portion corresponding to the dummy color filter. Then, the color filter layer may be developed.

In an example embodiment, a thickness of the dummy color filter may be substantially thinner than a thickness of the color filter.

According to another aspect of the present invention, there is provided a method of manufacturing a display panel. In the method, a switching element is formed on a first base substrate. Then, a color filter is formed on the first base substrate on which the switching element is formed. The color filter has a first recessed portion formed on an area corresponding to the switching element. Then, a pixel electrode is formed on the first base substrate on which the color filter is formed. The pixel electrode is electrically connected to the switching element. Then, a common electrode is formed on a second base substrate. Then, a spacer is formed on the second base substrate on which the common electrode is formed. Then, the first base substrate and the second base substrate are coupled with each other so that the spacer is disposed on a position corresponding to the first recessed portion.

In an example embodiment, a passivation layer may be further formed on the first base substrate on which the color filter is formed. Then, a photoresist pattern may be formed on the first base substrate on which the passivation layer is formed. Then, the passivation layer may be removed using the photoresist pattern as an etch stop layer to expose the color filter. The first recessed portion may be formed by removing the color filter exposed by the first hole using the photoresist pattern and the passivation layer as an etch stop layer.

According to another aspect of the present invention, a display panel includes a first substrate, a second substrate and a spacer. The first substrate includes a first base substrate, a first switching element, a color filter, a passivation layer and a pixel electrode. The first switching element is connected to an n-th gate line and an m-th data line formed on the first base substrate ('n' and 'm' are natural numbers), a second switching element electrically connected to the first switching element, and a third switching element electrically connected to the second switching element and an (n+1)-th gate line. The color filter is formed on the first base substrate on which the first to third switching elements are formed to have a recessed portion. The passivation layer is formed on the first base substrate on which the color filter is formed to have a hole connected to the recessed portion. The pixel electrode includes a first sub-electrode electrically connected to the first switching element and a second sub-electrode electrically connected to the third switching element. The second substrate includes a second base substrate facing the first base substrate and a common electrode formed on the second base substrate. The spacer is formed between the first substrate and the second substrate in correspondence with the recessed portion.

In an example embodiment, the first substrate may further include a storage line and a charge down capacitor. The storage line may overlap with a portion of the first sub-electrode. The charge down capacitor may be electrically connected to the storage line and a drain electrode of the third switching element to down a voltage applied to the second sub-electrode.

In an example embodiment, the recessed portion may be formed on an area corresponding to the first and second switching elements.

In an example embodiment, the recessed portion may include a first recessed portion formed on an area corresponding to the first and second switching elements, a second recessed portion formed on an area corresponding to the n-th gate line, and a third recessed portion formed on an area corresponding to the charge down capacitor. The spacer may be formed on an area corresponding to at least one of the first recessed portion and the second recessed portion.

In an example embodiment, the recessed portion may be formed on an area corresponding to the n-th gate line.

According to some example embodiments of the present invention, a spacer is formed on the dummy color filter, so that an amount of photoresist for forming the spacer is increased so that uniformity of the spacer may be enhanced.

Moreover, a recessed portion is formed through an area in which a switching element is formed and the spacer is disposed on the recessed portion, so that a height of the spacer is secured so that it may prevent a smear from being generated due to a varying of a cell gap.

BRIEF DESCRIPTION OF THE DRAWINGS

The above and other features and advantages of the present disclosure of invention will become more apparent by describing in detailed example embodiments thereof with reference to the accompanying drawings, in which:

FIGS. 11A to 11D are cross-sectional views explaining a method of manufacturing a first substrate shown in FIG. 10;

DETAILED DESCRIPTION

Hereinafter, the present teachings will be explained in greater detail with reference to the accompanying drawings.

Figure 1:
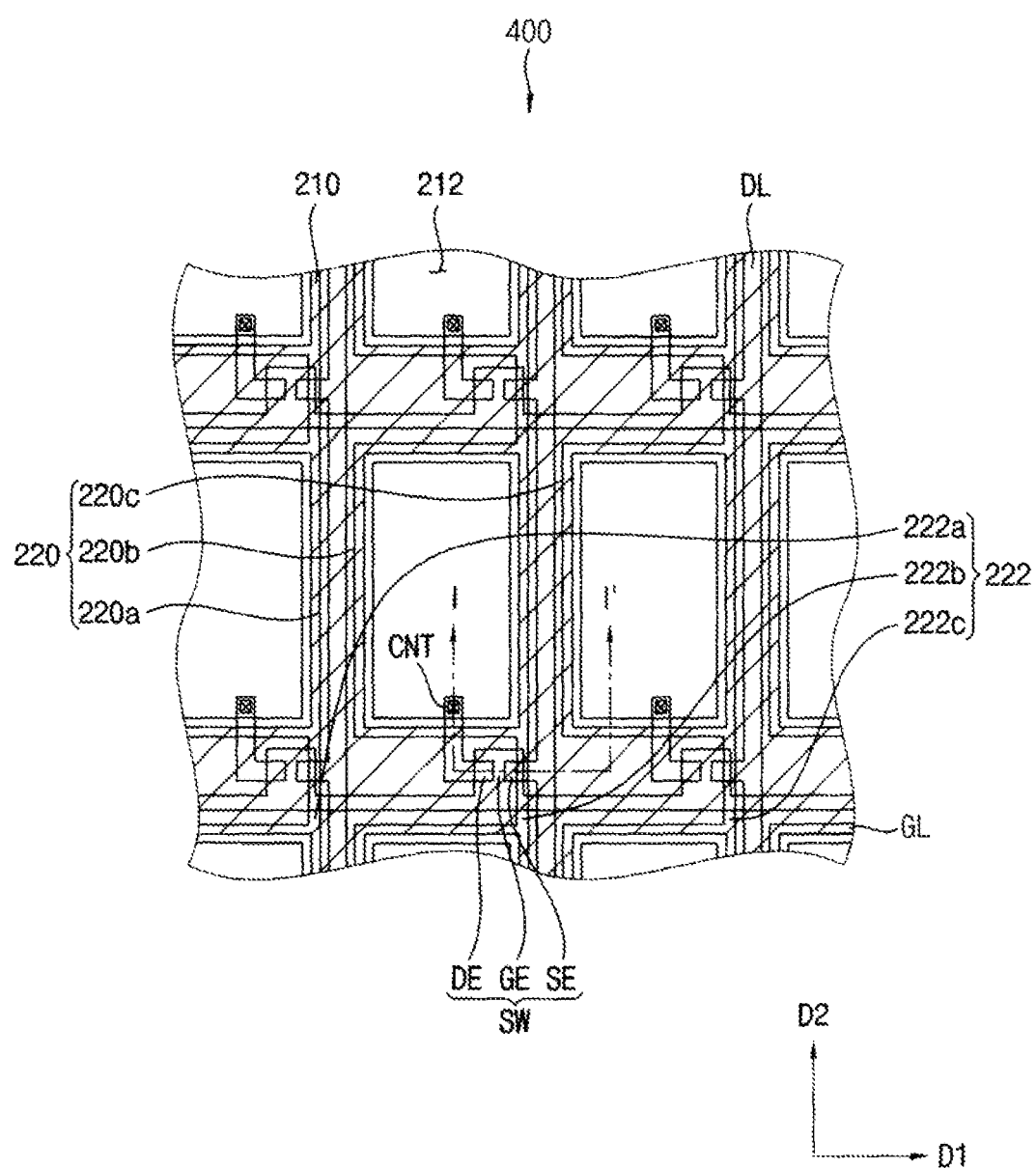
FIG. 1 is a plan view illustrating a display panel according to one exemplary embodiment in accordance with the disclosure.
Figure 2:
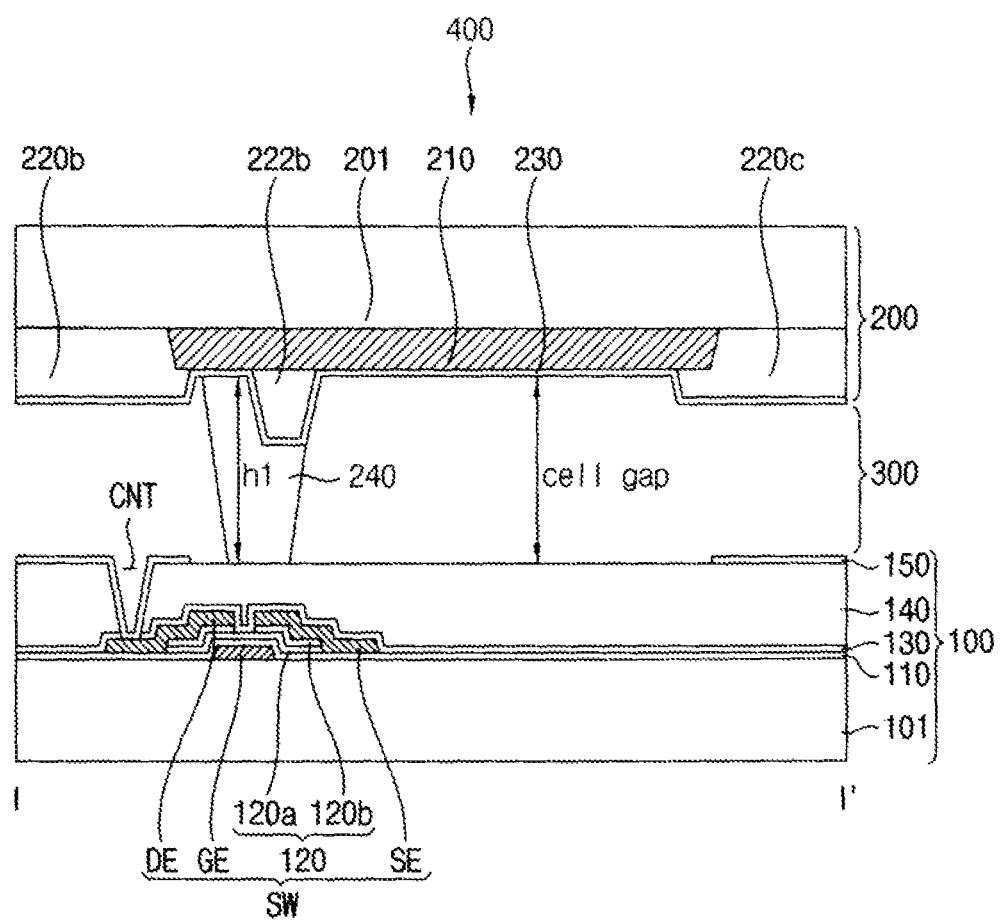
FIG. 2 is a cross-sectional view taken along a line I-I' of FIG. 1.

FIG. 1 is a plan view illustrating a display panel according to a first exemplary embodiment in accordance with the present disclosure. FIG. 2 is a cross-sectional view taken along a line I-I' of FIG. 1. It is to be understood with regard to the first exemplary embodiment (FIGS. 1-2) that it includes a plurality of spacers disposed between first and second substrates where the spacers are formed from cured spacer material (e.g., hardened photoresist) and the spacer material is deposited prior to its curing as droplet volumes of uncured such as by means of inkjet deposition or an equivalent thereof.

Referring now to the specifics of FIGS. 1 and 2, a display panel 400 according to the first exemplary embodiment includes a first substrate 100, a second substrate 200 and a liquid crystal layer 300 interposed between the first and second substrates 100 and 200.

The first substrate 100 may include a first base substrate 101, a gate line GL, a data line DL, a gate insulation layer 110, a switching element SW, a passivation layer 130, an organic insulation and planarization layer 140 and a pixel electrode 150.

The gate line GL extends along a first direction D1. The data line DL extends along a second direction D2 crossing the first direction D1.

The gate insulation layer 110 is formed to cover the gate line GL and a gate electrode GE that integrally protrudes from the gate line GL to form the gate electrode GE of the corresponding switching element SW of a given pixel unit or cell.

The switching element SW may be disposed adjacent to a corner area of the cell where the corresponding gate line GL and the data line DL are crossed with each other. The switching element SW includes a gate electrode GE, a semiconductive pattern region 120, a source electrode SE and a drain electrode DE. The gate electrode GE is electrically connected to the gate line GL and typically is a contiguous branch extension of the gate line GL. The semiconductive pattern region 120 insulatively overlaps with the gate electrode GE, being spaced apart therefrom by the interposed the gate insulation layer 110. The semiconductive pattern region 120 may include an active layer 120a and an ohmic contact layer 120b. The active layer 120a may include at least one of amorphous silicon (a-Si), a monocrystalline silicon and a semiconductive oxide. The ohmic contact layer 120b may include an amorphous silicon (n+a-Si) doped with N type dopants at a relatively high concentration. The source and drain electrodes SE and DE may be disposed on the first semiconductive pattern 120 to be spaced apart from each other and leave a channel region therebetween.

The passivation layer 130 is formed on the first base substrate 101 on which the source and drain electrodes SE and DE are formed.

The organic layer 140 is formed on the first base substrate 101 on which the passivation layer 130 is formed. The organic layer 140 may be used to planarize the first substrate 100. The organic layer 140 is optional and may be omitted. A contact hole CNT is formed through the passivation layer 130 and the organic layer 140 to expose the drain electrode DE.

The pixel electrode 150 is formed on the first base substrate 101 on which the organic layer 140 is formed. The pixel electrode 150 is electrically connected to the drain electrode DE of the switching element SW through the contact hole CNT penetrating the organic layer 140 and the passivation layer 130. The pixel electrode 150 may include an electrically conductive and optically transparent material. For example, the pixel electrode 150 may include an indium tin oxide (ITO) and an indium zinc oxide (IZO).

The second substrate 200 may include a second base substrate 201, a black matrix pattern 210, a color filter 220, a dummy color filter 222, a common electrode 230 and a spacer 240.

The black matrix pattern 210 includes an opening portion 212 formed in accordance with pixel areas such as R, G and B pixel areas that are defined on the second base substrate 201.

The color filter 220 is formed to fill and cover the opening portion 212 formed on the black matrix pattern 210. The color filter 220 may include a first color filter 220a, a second color filter 220b and a third color filter 220c. For example, the first color filter 220a may be composed of a corresponding first color filter material that selectively passes through a primarily green range of light wavelengths, the material of the second color filter 220b may pass through a primarily red range of light wavelengths, and the material of the third color filter 220c may pass through a primarily blue range of light wavelengths. Although not shown in FIGS. 1 and 2, the color filter 220 may instead filter for four or more so-called primary colors (e.g., RGBW).

During manufacture, the dummy color filter structure 222 is formed on and protruding vertically from the back matrix pattern 210 between pixel areas that are arranged to be spaced apart from each other for example along an identical vertical line. The dummy color filter structure 222 may itself define a plurality of vertical lines that are interposed between horizontally adjacent color filters 220. In one embodiment, each dummy color filter vertical line 222j (where j=a, b, etc.) is formed to have a width (W2) that is substantially smaller than a width (W1) of the immediately adjacent color filter 220. Each dummy color filter vertical line 222j has a corresponding thickness (T2) whose dimension contributes to the final (cured) height of an overlapping spacer (240) as shall be described in more detail shortly After the dummy color filter 222j (j=a, b, c etc.) is formed, the common electrode 230 is formed on the second base substrate 201 on which the color filter 220 and the dummy color filter 222 are pre-formed. The common electrode 230 is thus formed above the second substrate 200.

The spacer 240 is formed on top of the common electrode 230. As mentioned above, the spacer 240 is generally formed in accordance with the present disclosure by using an inkjet deposition device or the like to deposit one or more volumetric amounts of uncured spacer material, which when hardened, form the spacer 240 and define the separation distance that the hardened spacer 240 provides for as between the first and second substrates, 100-200. In the first exemplary embodiment, the spacer 240 is formed on an area that includes the dummy color filter structure 222. The spacer 240 overlaps with the dummy color filter 222 as shown in FIG. 2. When the first and second substrates 100 and 200 are coupled (e.g., bonded) to each other, the spacer 240 may contact with the first substrate 100. The spacer 240 may thus play a role of maintaining an interval between the first substrate 100 and the second substrate. A cell may be defined by a thickness of the liquid crystal layer 300. In this exemplary embodiment, the cell gap of the display panel 400 may be about 3.0 μm to about 3.6 μm. In this case, the spacer 240 may have an effective first height 'h' smaller than the predefined cell gap dimension of the display panel 400. For example, when the cell gap between the first and second substrates 100 and 200 is about 3.6 μm, the first height 'h' is about 2.8 μm to about 3.0 μm. When the cell gap between the first and second substrates 100 and 200 is about 3.0 μm, the first height 'h' is about 2.4 μm to about 2.6 μm. Alternatively, when the first substrate 100 and the second substrate 200 are combined with each other, the spacer 240 may be compressed. Thus, the spacer 240 may have a height greater than or equal to the cell gap. For example, when the cell gap is about 3.6 μm, the height of the spacer 240 may be about 3.8 μm to about 4.0 μm. When the cell gap is about 3.0 μm, the height of the spacer 240 may be about 3.2 μm to about 3.4 μm. A height of the spacer 240 may be varied in accordance with a thickness of a portion corresponding to the spacer 240 at the first substrate 100. The spacer 240 may be spaced apart from the first substrate 100 by a predetermined distance. In this case, the spacer 240 may secure a margin of a liquid crystal injecting process or maintain a tolerance for a pressure applied from an external side. In one embodiment, formation of the spacer 240 includes depositing by means of inkjet deposition or the like, one or more ink-ejection defined volumes of curable spacer material on top of a corresponding one of dummy color filters 222j (j=a, b, c etc.) and hardening the so-deposited spacer material. The final height of the cured spacer material may accordingly be made to be a function of the height of the corresponding dummy color filter 222j (j=a, b, c etc.) as well as a function of other factors, including but not limited to: viscosity of the deposited spacer material, temperature, volume of each of the one or more ejections of uncured spacer material.

Figure 3:
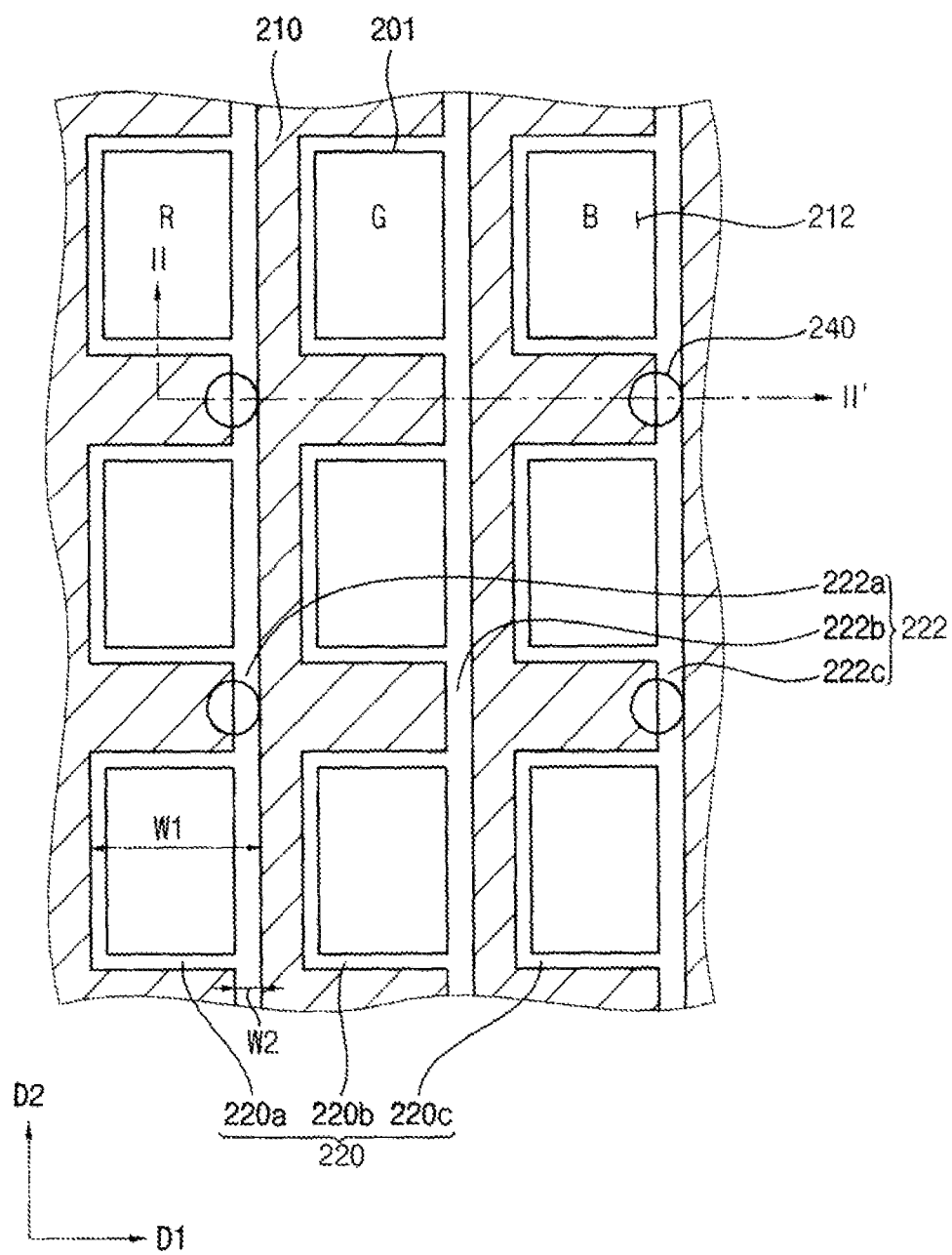
FIG. 3 is a plan view illustrating a second substrate according to another exemplary embodiment.
Figure 4:
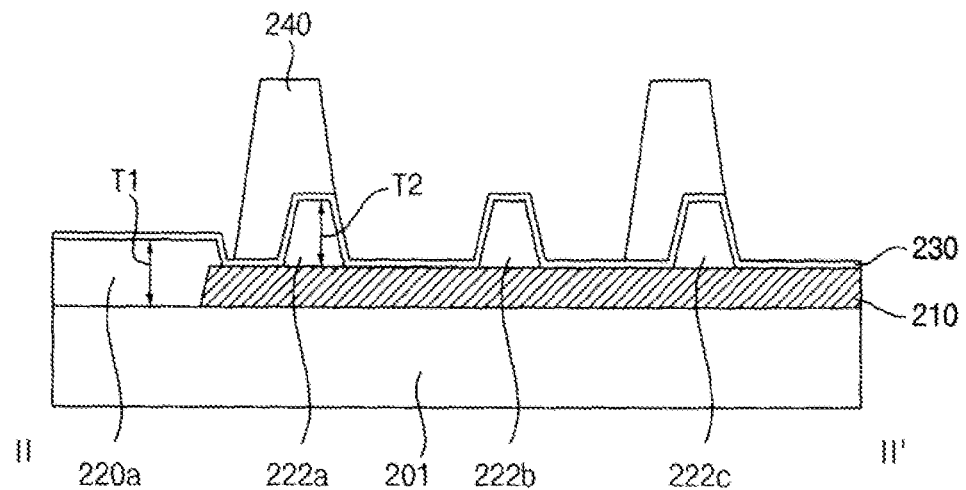
FIG. 4 is a cross-sectional view taken along a line II-II' of FIG. 3.

FIG. 3 is a plan view illustrating a second substrate according to another exemplary embodiment where an exemplary manufacture thereof will be described with reference to FIGS. 5A-5C and 6A-6D. FIG. 4 is a cross-sectional view taken along a line II-II' of FIG. 3.

Referring first to FIGS. 3 and 4, the color filter 220 may include a first color filter 220a, a second color filter 220b and a third color filter 220c. Each of the first to third color filters 220a, 220b and 220c may be arranged in a line along a second direction D2.

The dummy color filter structure 222 may include a first dummy color filter 222a, a second dummy color filter 222b and a third color filter 222c. The first dummy color filter 222a is formed between the first color filters 220a that are spaced apart from each other along the second direction D2 to be connected to the first color filters 220a. The second dummy color filter 222b is formed between the second color filters 220b that are spaced apart from each other along the second direction D2 to be connected to the second color filters 220b. The third dummy color filter 222c is formed between the third color filters 220c that are spaced apart from each other along the second direction D2 to be connected to the third color filters 220c. The first dummy color filters 222a have a same material and a color identical to the color of the actually used first color filter 220a. Similarly, the second dummy color filters 222b have a same colored material identical to that of the second color filter 220b. The third dummy color filters 222c have a colored material identical to that of the third color filter 220c.

A thickness T2 of the first to third dummy color filters 222a, 222b and 222c may be equal to a thickness T1 of the first to third color filters 220a, 220b and 220c. Alternatively, the thickness T2 of the first to third dummy color filters 222a, 222b and 222c may be thinner than a thickness T1 of the first to third color filters 220a, 220b and 220c. In other words, when the colored materials of the actual and respective first to third color filters 220a, 220b and 220c are deposited, the same deposition process and same materials may be used for depositing the colored materials of the respective first to third dummy color filters 222a, 222b and 222c. As a result the initial thickness T2' of each respective dummy color filter 222j may be initially made essentially equal to the thickness T1 of its respective color filter 220j (where j=a, b, c, etc.). In the case where T2 is to be made smaller than the initial first thickness T1, a relatively accurate etch back process may be used to selectively etch back the heights T2 of the dummy color filter 222j by a predetermined amount. Alternatively the second thickness T2 may be controlled photolithographically as shall be described later below. In either case, the final thickness T2 of the respective dummy color filters 222j (where j=a, b, c, etc.) plays a role in defining the spaced apart between the first and second substrates at each corresponding cell location.

The first to third color filters 220a, 220b and 220c may be formed to have a first width W1, and the first to third dummy color filter lines 222a, 222b and 222c may be formed to have a second width W2 that is substantially smaller than the first width W1. The second width W2 may be set to corresponding to a diameter of the spacer 240 where the latter spacer 240 is to partially overlap on the corresponding dummy color filter 222j. The second width W2 may be formed to have a width no more than about 70% of the diameter of the spacer 240. For example, the second width W2 may be formed to have a width no more than about 50% of the diameter of the spacer 240.

Hereinafter, a method of manufacturing the display panel 400 shown in FIG. 2 will be explained with reference to FIGS. 2, 5A to 5C and 6A to 6D.

Firstly, a method of manufacturing the first substrate 100 will be briefly described with reference to FIG. 2.

Referring to FIG. 2, a gate metal pattern including a plurality of parallel gate lines GL and with corresponding gate electrodes GE branching integrally from each are formed on the first base substrate 101. A gate metal layer (not shown) may be blanket formed on the first base substrate 101, and then the gate metal layer is patterned to form the gate metal pattern.

Then, the gate insulation layer 210 is formed on the first base substrate 101 on which the gate metal pattern is formed. The semiconductive pattern 120 is formed on the gate insulation layer 110. The active layer and the ohmic contact layer portions of the semiconductive pattern 120 may be blanket formed on the gate insulation layer 210 and then the active layer and the ohmic contact layer may be patterned to form the first semiconductive pattern 120. Islands of the semiconductive pattern 120 may overlap with respective ones of the gate electrodes GE.

Then, a source metal pattern including the source and drain electrodes SE and DE is formed on the substrate on which the semiconductive pattern 120 is pre-formed. The source metal layer may be blanket formed over the first semiconductive pattern 120 and then the source metal layer may be patterned to form the source and drain metal patterns of respective TFT transistors.

The passivation layer 130 and the organic layer 140 are sequentially formed on the first substrate after that. Then, the organic layer 140 and the passivation layer 130 on the drain electrode DE are selectively etched to form the contact holes CNT for exposing the drain electrodes DE.

The pixel electrode 150 is then formed on the first substrate on which the organic layer 140 is pre-formed, and the pixel electrode 150 deposited into the contact holes CNT so as to be electrically connected to the drain electrodes DE through the contact holes CNT.

Hereinafter, a method of manufacturing the second substrate according to the present exemplary embodiment will be described with reference to FIGS. 5A to 5C.

Figure 5A:
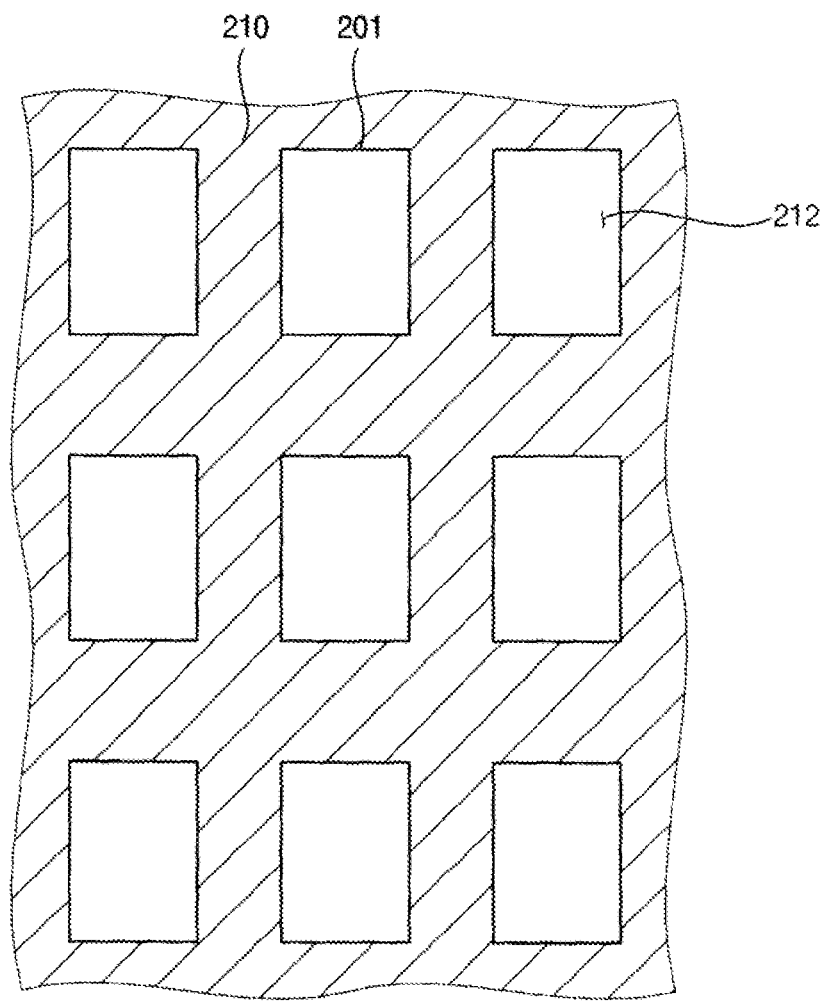
FIGS. 5A to 5C are plan views explaining a method of manufacturing a second substrate shown in FIG. 4.
Figure 5B:
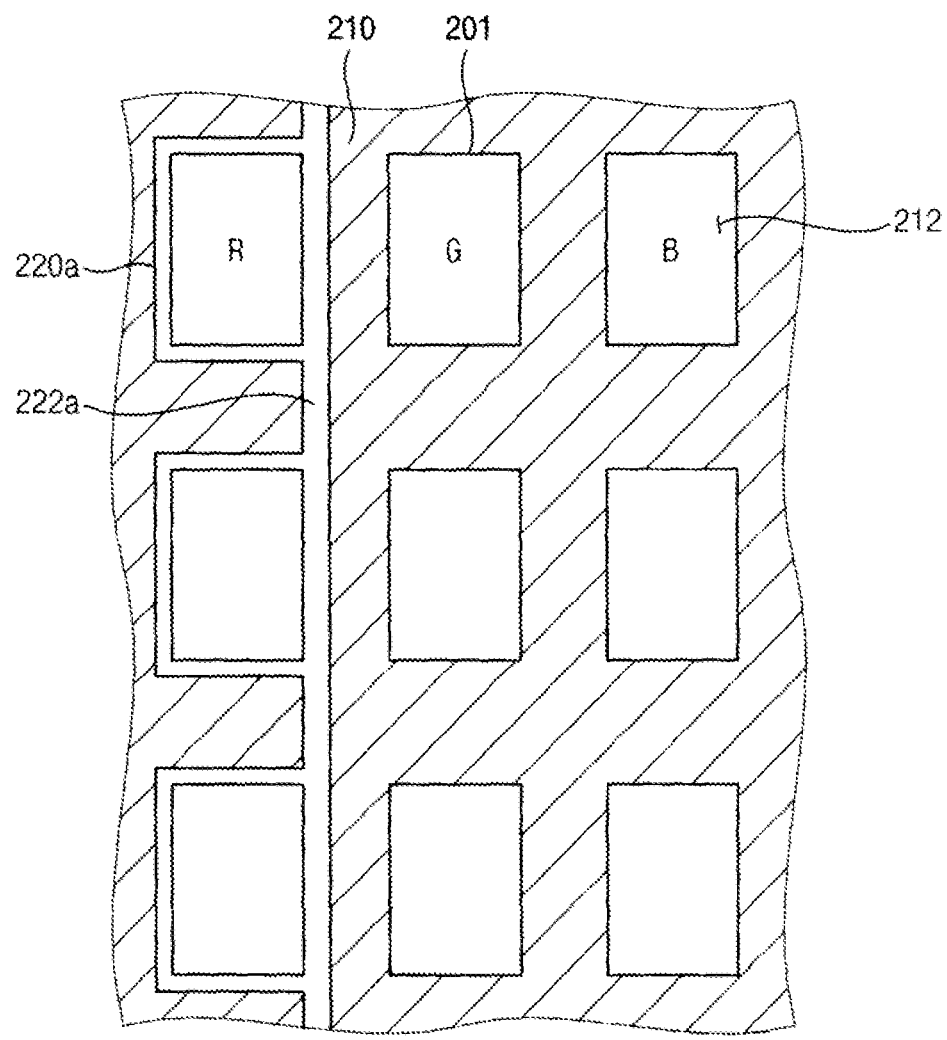
Figure 5C:
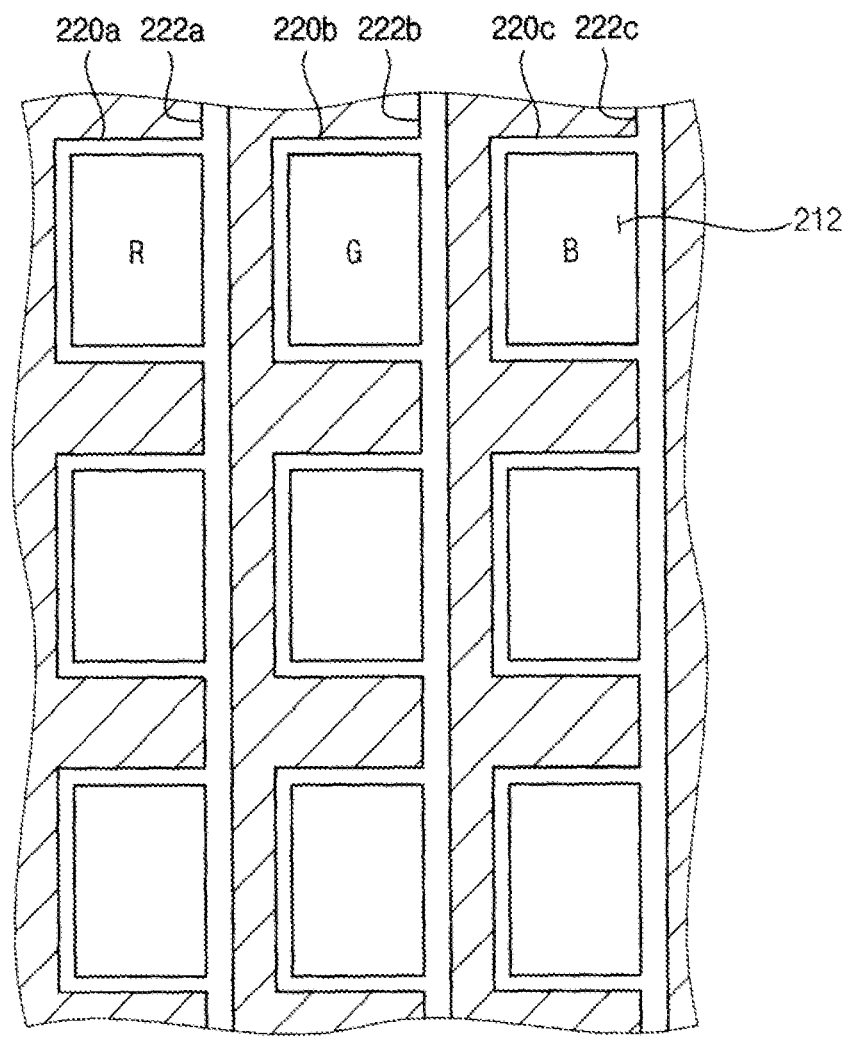

FIGS. 5A to 5C are plan views explaining a method of manufacturing a second substrate shown in FIG. 4. FIGS. 6A to 6D are corresponding cross-sectional views explaining a method of manufacturing a second substrate shown in FIG. 4.

Figure 6A:
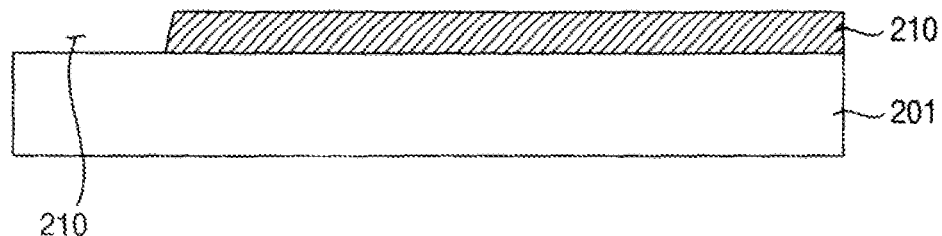
FIGS. 6A to 6D are cross-sectional views explaining a method of manufacturing a second substrate shown in FIG. 4.

Referring to FIGS. 4, 5A and 6A, the black matrix pattern 210 is formed on the second base substrate 201. In one embodiment, a black matrix layer is blanket formed on the second base substrate 201, and then the black matrix layer is selectively patterned to have a plurality of openings 212 and thus form the black matrix pattern 210. For one example, the black matrix layer may be formed by a metal material such as chromium (Cr), a chromium oxide (CrOx). For another example, the black matrix layer may be formed by a light-sensitive organic layer such as a carbon black resin.

Figure 6B:
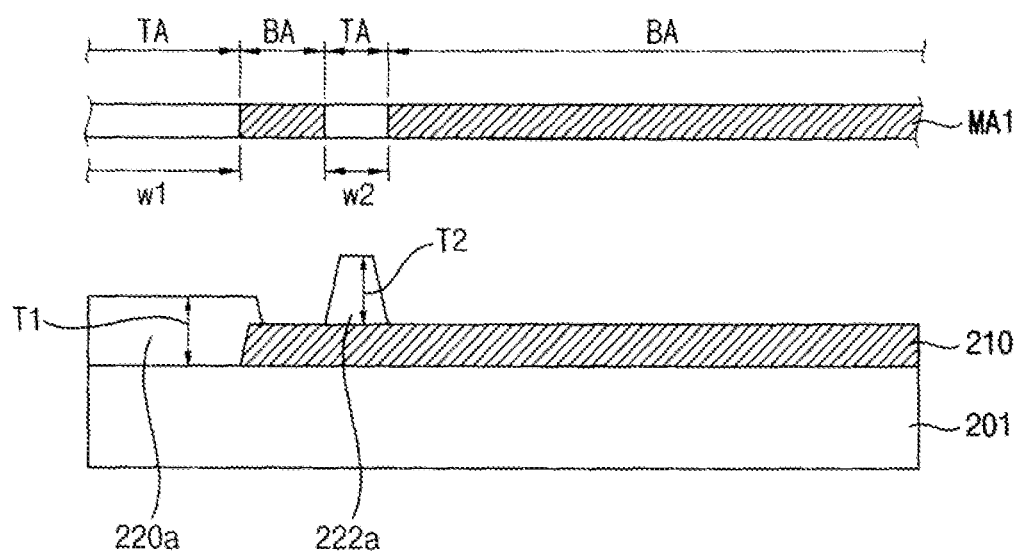

Referring to FIG. 5B and corresponding FIG. 6B, the first colored filter material (e.g., Red for color filters 220a and for the same colored first dummy color filter 222a) is blanket formed to a predetermined thickness (T2') on the second base substrate 201 on which the patterned black matrix pattern 210 is already formed. More specifically, in the process a first colored photoresist layer ($PR_{red}$, not shown) is blanket formed on a whole surface of the second base substrate 201 and patterned black matrix pattern 210, and then the first colored photoresist layer is exposed and developed by using a first mask MA1 (schematically shown in FIG. 6A) provided for the first photoresist layer to thus form a patterning of the first color filter 220a and the first dummy color filter 222a as shown in FIG. 5B. The first mask MA1 includes a light-transmitting portion TA transmitting lights and a light-blocking portion BA blocking lights. A width 'w2' of the light-transmitting portion TA corresponding to an area on which the first dummy color filter 222a is to be formed is substantially smaller than a width 'w1' of the light-transmitting portion TA corresponding to an area on which the first color filter 220a is to be formed. When the first color photoresist layer is exposed and developed by using the first mask MA1, the first color photoresist layer corresponding to the light-blocking portion BA is selectively removed by a developing solution, and the first color photoresist layer corresponding to the light-transmitting portion TA is not removed to be thus selectively left behind on the second base substrate 201. Thus, the first color filter 220a and the first dummy color filter 222a may be simultaneously formed to have an essentially same initial first thicknesses, T1.

Thus initially a respective thickness T2 of the first dummy color filter 222a may be made essentially equal to the thickness T1 of the first color filter 220a. Alternatively, the thickness T2 of the first dummy color filter 222a may be made controllably smaller than the thickness T1 of the first color filter 220a. In one exemplary case, the first mask MA1 may include a half-transmitting portion (e.g., a slitted area not shown) disposed on the area (originally TA) corresponding to the first dummy color filter 222a. As a result of photolithographic processing, the second thickness T2 will then be controllably less than the first thickness T1.

Figure 6C:
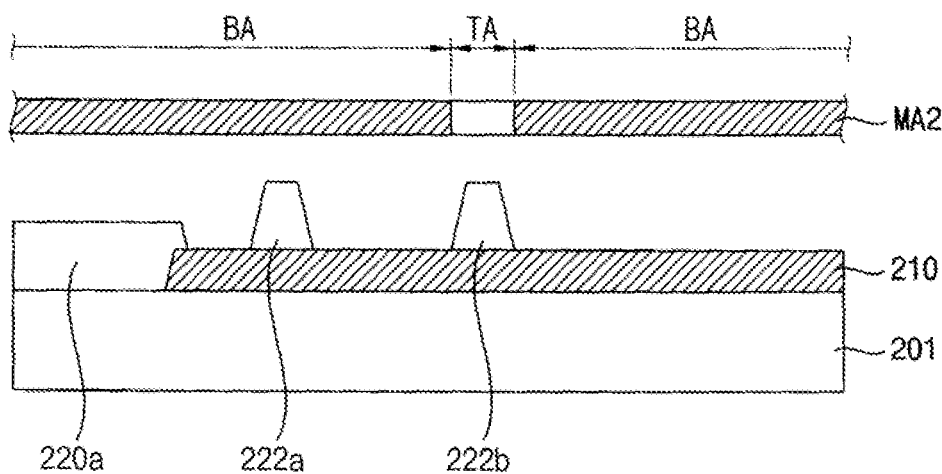

Referring to cross-corresponding FIGS. 5C and 6C, next the second color filter 220b and the second dummy color filter 222b (e.g., Green) are formed on the second base substrate 201 on which the first color filter 220a and the first dummy color filter 222a are already formed. A second color photoresist layer (not shown) is formed on a whole surface of the second base substrate 201, and then the second color photoresist layer is exposed and developed by using a second mask MA2 (FIG. 6C) disposed on the second photoresist layer to form the second color filter 220b and the second dummy color filter 222b. The second mask MA2 includes a light-transmitting portion TA and a light-blocking portion BA. When the second color photoresist layer is exposed and developed by using the second mask MA2, the second color photoresist layer corresponding to the light-blocking portion BA is removed by a develop solution, and the second color photoresist layer corresponding to the light-transmitting portion TA is not removed to be remained on the second base substrate 201. Thus, the second color filter 220b and the second dummy color filter 222b are formed.

Figure 6D:
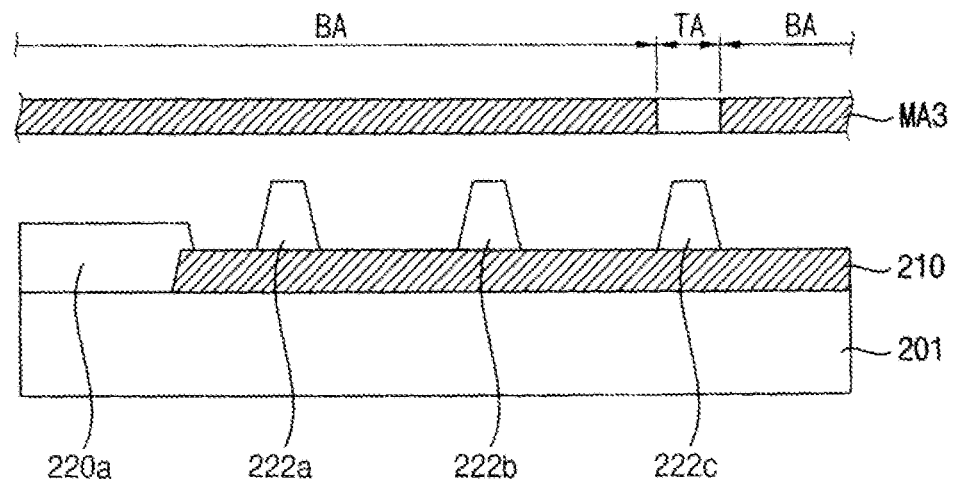

Referring to FIGS. 5D and 6D, next a third color filter 220c and a third dummy color filter 222c (e.g., Blue) are formed on the second base substrate 201 on which the first color filter

220a, the first dummy color filter 222a, the second color filter 220b and the second dummy color filter 222b are already formed. A third color photoresist layer (not shown) is formed on a whole surface of the second base substrate 201, and then the third color photoresist layer is exposed and developed by using a third mask MA3 (FIG. 6D) disposed on the third color photoresist layer to form the third color filter 220c and the third dummy color filter 222c. The third mask MA3 includes a light-transmitting portion TA and a light-blocking portion BA. The light-transmitting portion TA may be disposed on an area on which the third color filter 220c and the third dummy color filter 222c are formed.

Then, the common electrode 230 is formed on the second base substrate 201 on which the first to third color filters 220a, 220b and 220c and the first to third dummy color filters 222a, 222b and 222c are already formed. The common electrode 230 is formed on a whole surface of the second base substrate 201. The spacer 240 is thereafter formed on the second base substrate 201 on which the common electrode 230 is formed. A photoresist layer (not shown) is formed on the second base substrate 201 on which the common electrode 230 is formed, and the photoresist layer is exposed and developed to form the spacer 240. A photoresist is coated on a whole surface of the second base substrate 201 by using a nozzle of a coating device (not shown), so that the photoresist layer may be formed on the second base substrate 201.

As shown in FIG. 4, the plural spacers 240 shown therein may be formed on respective areas that partially overlap with respective ones of the first dummy color filter 222a and the third dummy color filter 222c. Although not shown in FIG. 4, a third spacer 240 may be formed on an area corresponding to the second dummy color filter 222b. Thus, the second substrate 200 according to the present invention may be manufactured to have a plurality of spaces each partially overlapping a corresponding one of the dummy color filters 222j (where j=a, b, c, etc.).

The first substrate 100 and the second substrate 200 are then coupled to each other. As shown in FIG. 2, the liquid crystal layer 300 is disposed between the first and second substrates 100 and 200. For example, liquid crystals are dropped on the first substrate 100, and then the first substrate 100 and the second substrate 200 are coupled to each other to form the liquid crystal layer 300. Alternatively, the first substrate 100 and the second substrate 200 are coupled to each other, and then liquid crystals are injected between the first and second substrates 100 and 200 to form the liquid crystal layer 300.

According to the present exemplary embodiment, the spacer 240 is formed on the dummy color filter 222, so that a volumetric amount of a photoresist used for inkjet-wise forming the spacer 240 may be decreased because the spacer is partially formed by the dummy color filter. This decrease in amount of inkjet deposited PR material used, may help reduce or prevent coating defects from being generated on the second base substrate 201 which defects are due to difficulty to control small amounts of the photoresist material discharged from the nozzle of the inkjet coating device (not shown), so that a uniformity of the heights of the spacers 240 may be secured. More specifically, the inkjet nozzle (not shown) is aimed so that part of its deposited volume of PR material lands on the flat top of the corresponding dummy color filter 222j (j=a, b, c etc.) and part flows down a sidewall of the corresponding dummy color filter 222j. As a result, the final effective height of the spacer 240 is caused to be a function of the thickness (T0) of the black matrix layer 210 plus the thickness T2 of the dummy color filter 222j (j=a, b, c, etc.) and also a function of the viscosity of the deposited volume of PR material rather than being a function of the latter volume taken alone. As mentioned above, it is difficult to precisely control that volume by means of inkjet ejection. However, it is possible to control viscosity and hardening time of the inkjet ejected PR material by a variety of controllable manufacturing parameters such as temperature and composition of the inkjet ejected PR material. It is also easier to control the thickness (T0) of the black matrix layer 210 plus the thickness T2 of the corresponding dummy color filter 222j (j=a, b, c, etc.). Accordingly, the effective spacer height becomes more controllable.

A display panel 500 according to the present exemplary embodiment is substantially the same as the display panel 400 of FIGS. 1 and 2 except for a second substrate 201, and thus a description of remaining components except the second substrate 201 is referred to FIG. 2. A plan view of the second substrate 201 is substantially the same as a plan view of the second substrate 200 of FIG. 3, and thus a detailed description thereof will be omitted. Moreover, the second substrate 201 is substantially the same as the second substrate 200 of FIG. 4 except for a black matrix pattern 210a, a first dummy color filter 223a, a second dummy color filter 223b and a third dummy color filter 223c. Thus, identical reference numerals are used in FIGS. 5A to 6D to refer to components that are the same or like those shown in FIG. 4, and thus a detailed description thereof will be omitted.

Figure 7:
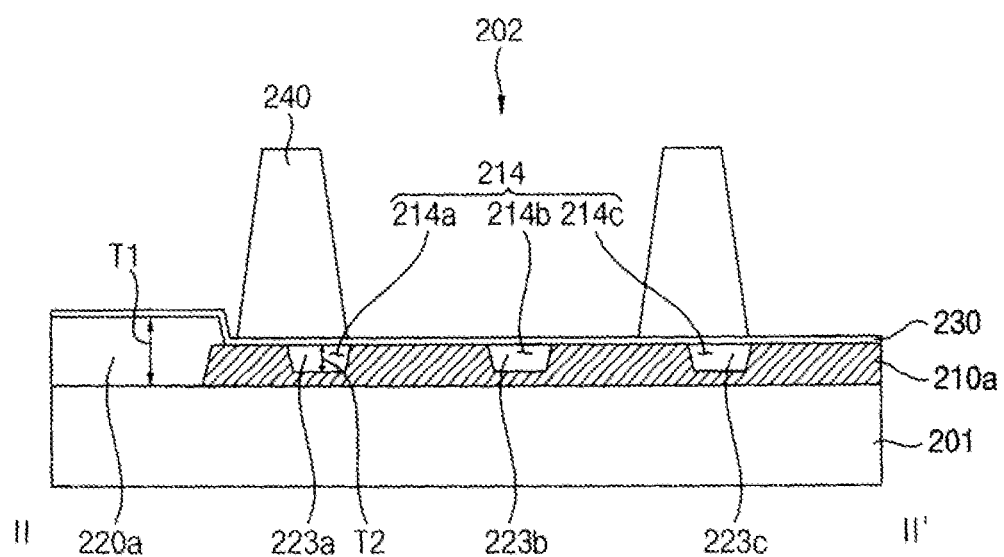
FIG. 7 is a cross-sectional view illustrating a second substrate according to another exemplary embodiment.

FIG. 7 is a cross-sectional view illustrating a second substrate according to another exemplary embodiment in accordance with the present disclosure.

Referring to FIGS. 3 and 7, the second substrate 201 may include a second base substrate 201, the black matrix pattern 210a, a first color filter 220a, a second color filter 220b, a third color filter 220c, the first to third dummy color filters 223a, 223b and 223c, a common electrode 230 and a spacer 240.

The black matrix pattern 210a includes recessed portions 214 that are recessed by a predetermined depth. The recessed portions 214 include a first recessed portion 214a, a second recessed portion 214b and a third recessed portion 214c. The first recessed portion 214a may be formed in respective areas of the black matrix corresponding to the location of the first dummy color filter 223a, the second recessed portion 214b may be formed in an area corresponding to the second dummy color filter 223b, and the third recessed portion 214c may be formed in an area corresponding to the third dummy color filter 223c.

A thickness T2 of the first dummy color filter 223a may be thinner than a thickness T1 of the first color filter 220a. Although not shown in drawings, thicknesses of the second and third dummy color filters 223b and 223c may be thinner than those of the second and third color filters. Alternatively, a thickness T2 of the first dummy color filter 223a may be substantially equal to a thickness T1 of the first color filter 220a.

In a method of manufacturing a display panel according to the present exemplary embodiment, a method of manufacturing a first substrate is substantially the same the method of manufacturing the first substrate explained with reference to FIG. 2, and thus a detailed description thereof will be omitted.

FIGS. 8A to 8D are cross-sectional views explaining a method of manufacturing a second substrate shown in FIG. 7.

Figure 8A:
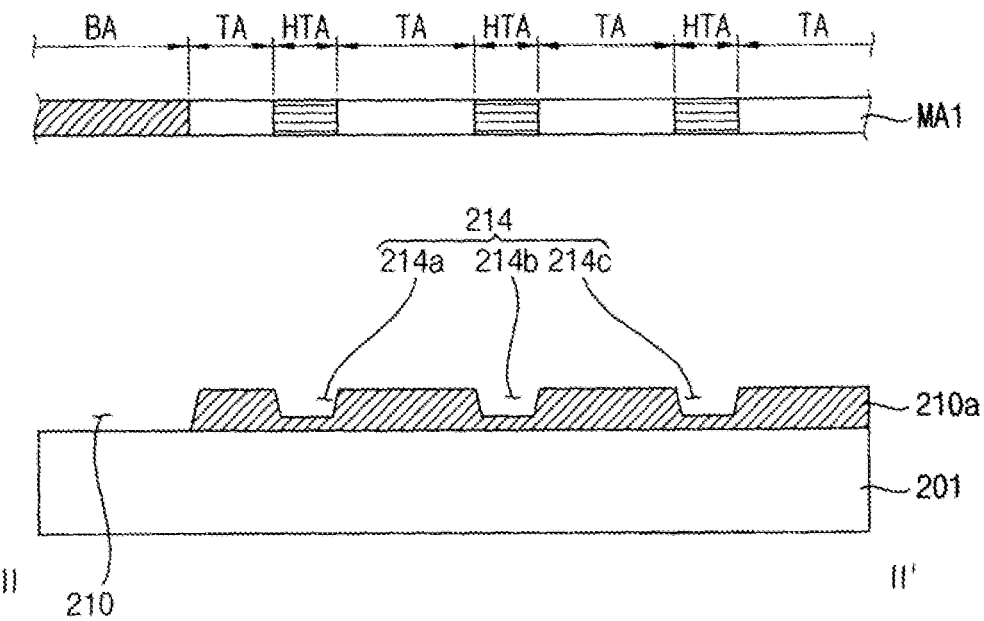
FIGS. 8A to 8D are cross-sectional views explaining a method of manufacturing a second substrate shown in FIG. 7.

Referring to FIGS. 7 and 8A, a black matrix pattern 210a is formed on the second base substrate 201. A black matrix layer (not shown) is formed on the second base substrate 201, and then the black matrix layer is exposed and developed by using a first mask MA1 disposed on the black matrix layer to form the black matrix pattern 210a. The first mask MA1 includes a light-transmitting portion TA, a light-blocking portion BA and a half-transmitting portion HTA. The light-blocking portion BA is disposed on an area corresponding to an opening portion 212, and the half-transmitting portion HTA is disposed on an area corresponding to the first to third recessed portions 214a, 214b and 214c. When lights are irradiated onto an upper portion of the first mask MA1 and it is developed by using a develop solution, the black matrix pattern 210a including the opening portion 212 and the first to third recessed portions 214a, 214b and 214c is formed. For example, the black matrix layer corresponding to the light-blocking portion BA may be removed by the develop solution, and the black matrix layer corresponding to the light-transmitting portion TA and the half-transmitting portion HTA may be remained on the second base substrate 201. The black matrix layer corresponding to the light-blocking portion BA is removed by the develop solution to form the opening portion 212. The black matrix layer corresponding to the half-transmitting portion HTA is partially removed by the develop solution to form the first to third recessed portions 214a, 214b and 214c. When a light amount transmitting through the half-transmitting portion HTA is adjusted, each of recessed depths of the first to third recessed portions 214a, 214b and 214c may be adjusted.

Although not shown in FIGS. 7 and 8A, the black matrix pattern 210a may be formed from a metal material such as chromium (Cr), a chromium oxide (CrOx), etc. For example, a metal layer is blanket formed on the second base substrate 201 to a predetermined thickness (T0), and then the metal layer is patterned to form the black matrix pattern 210a.

Figure 8B:
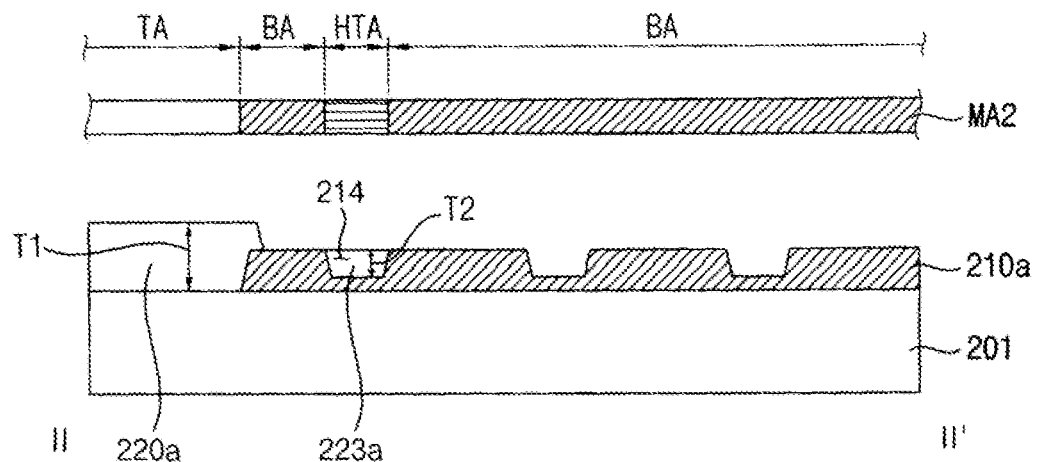

Referring to FIGS. 7 and 8B, the first color filter 220a and the first dummy color filter 223a are formed on the second base substrate 201 on which the black matrix pattern 210a is formed. A first photoresist layer (not shown) is formed on a whole surface of the second base substrate 201, and then the first photoresist layer is exposed and developed by using a second mask MA2 disposed on the first color photoresist layer to form the first color filter 220a and the first dummy color filter 223a. The second mask MA2 may include a light-transmitting portion TA, a light-blocking portion BA and a half-transmitting portion HTA. The light-transmitting portion TA is disposed on an area corresponding to an opening portion 212, and the half-transmitting portion HTA is disposed on an area corresponding to the first recessed portion 214a. For example, the first color photoresist layer corresponding to the light-blocking portion BA may be selectively removed by a developing solution. Thus, the black matrix pattern 210a is exposed. The first color photoresist layer corresponding to the light-transmitting portion TA is not removed by the develop solution to be remained on the second base substrate 201. Thus, the first color filter 220a is formed on the second base substrate 201. A portion of the first color photoresist layer corresponding to the half-transmitting portion HTA is removed by the develop solution, and a remaining of the first color photoresist layer remains on the second base substrate 201. Thus, the first dummy color filter 223a is formed. A thickness T2 of the first dummy color filter 223a is thinner than a thickness T1 of the first color filter 220a.

Figure 8C:
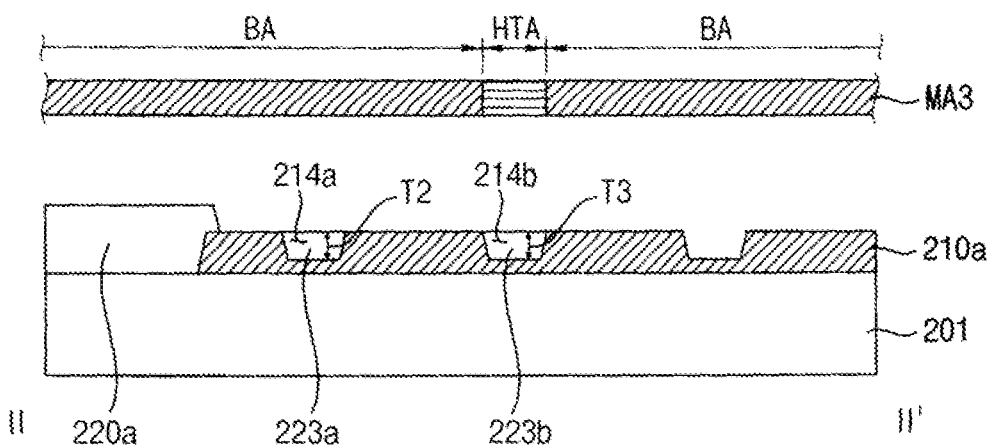

Referring to FIGS. 7 and 8C, the second dummy color filter 223a is formed on the second base substrate 201 on which the first color filter 220a and the first dummy color filter 223a are formed. A second photoresist layer (not shown) is formed on a whole surface of the second base substrate 201, and then the second photoresist layer is exposed and developed by using a third mask MA3 disposed on the second color photoresist layer to form the second dummy color filter 223b. The third mask MA3 may include a light-blocking portion BA and a half-transmitting portion HTA. The half-transmitting portion HTA is disposed on an area corresponding to the second recessed portion 214b. A portion of the second color photoresist layer corresponding to the half-transmitting portion HTA is removed by the develop solution, and a remaining of the second color photoresist layer remains on the second base substrate 201. Thus, the second dummy color filter 223b is formed. A thickness T3 of the third dummy color filter 223c is substantially equal to a thickness T2 of the second dummy color filter 223b.

Although not shown in drawings, the third mask MA3 may further include a light-transmitting portion (not shown). The light-transmitting portion is disposed on an area corresponding to a second color filter (not shown). The second color photoresist layer corresponding to the light-transmitting portion is not removed by the develop solution to be remained on the second base substrate 201. Thus, the second color filter is formed.

Figure 8D:
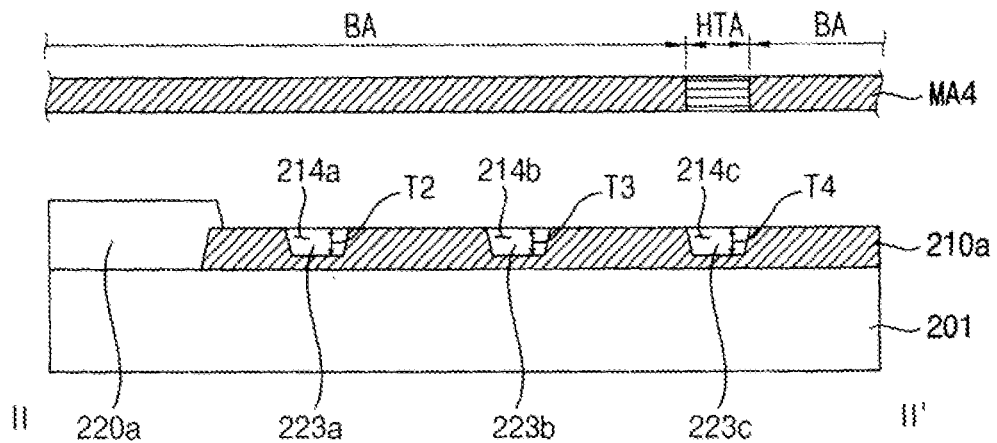

Referring to FIGS. 7 and 8D, the third dummy color filter 223c is formed on the second base substrate 201 on which the first color filter 220a, the first dummy color filter 223a and the second dummy color filter 223b are formed. A third photoresist layer (not shown) is formed on a whole surface of the second base substrate 201, and then the third photoresist layer is exposed and developed by using a fourth mask MA4 disposed on the third color photoresist layer to form the third color filter 223c. The fourth mask MA4 may include a light-blocking portion BA and a half-transmitting portion HTA. The half-transmitting portion HTA is disposed on an area corresponding to the third recessed portion 214c. A portion of the third color photoresist layer corresponding to the half-transmitting portion HTA is removed by the develop solution, and a remaining of the third color photoresist layer remains on the second base substrate 201. Thus, the third dummy color filter 223c is formed. A thickness T4 of the third dummy color filter 223c is substantially equal to each of the thicknesses T2 and T3 of the first and second dummy color filters 223a and 223b, respectively. Alternatively, each of the thicknesses T1, T2 and T3 of the first to third dummy color filters 223a, 223b and 223c is different from each other.

Although not shown in drawings, the third mask MA3 may further include a light-transmitting portion (not shown). The light-transmitting portion is disposed on an area corresponding to a third color filter (not shown). The third color photoresist layer corresponding to the light-transmitting portion is not removed by the develop solution to be remained on the second base substrate 201. Thus, the third color filter is formed.

Then, the common electrode 230 is formed on the second base substrate 201 on which the first color filter 220a and the second and third dummy color filters 223b and 223c are formed. The common electrode 230 is formed on a whole surface of the second base substrate 201. The height of the common electrode 230 in different portions over the black matrix may be controlled by the respective thicknesses T2-T4 of the recesses filled with respective dummy color filter materials 222j (j=a, b, c etc.). The spacer 240 is formed on the second base substrate 201 on which the common electrode 230 is so formed. A photoresist layer (not shown) is formed on the second base substrate 201, and then the photoresist layer is exposed and developed to form the spacer 240. As shown in FIG. 7, the spacer 240 may be formed on the first and third dummy color filters 223a and 223c.

According to the present exemplary embodiment, an amount of the photoresist used for forming the spacer 240 may be more increased in comparison with the above exemplary embodiment in which the first to third recessed portions 214a, 214b and 214c are not formed on the black matrix pattern 210a. For example, an amount of the photoresist may be more increased by a recessed depth of the first to third recessed portions 214a, 214b and 214c and a difference between a thickness of the first to third dummy color filters 223a, 223b and 223c and a thickness of the first to third color filters, in comparison with the above exemplary embodiment of FIGS. 1 to 6D.

Figure 9:
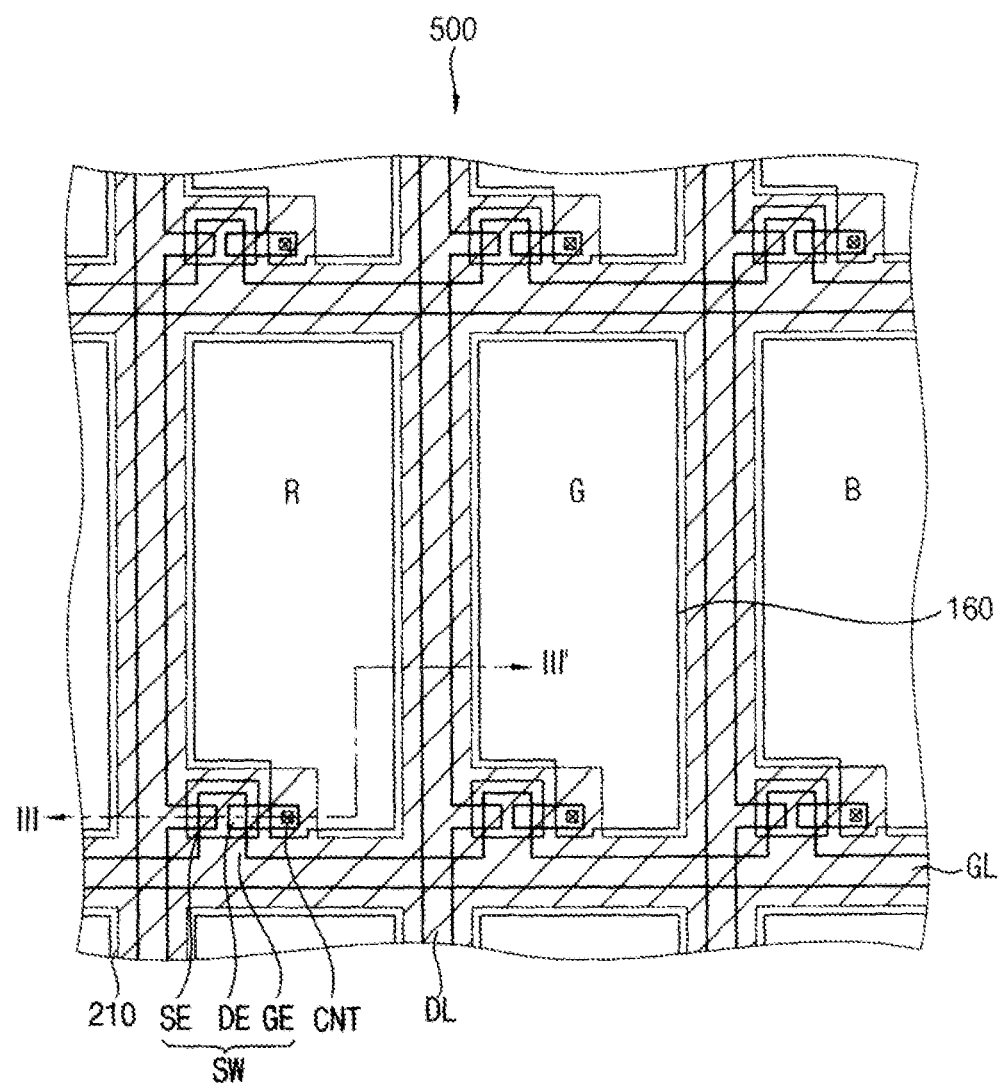
FIG. 9 is a plan view illustrating a display panel according to another exemplary embodiment.

FIG. 9 is a plan view illustrating a display panel according to another exemplary embodiment.

Figure 10:
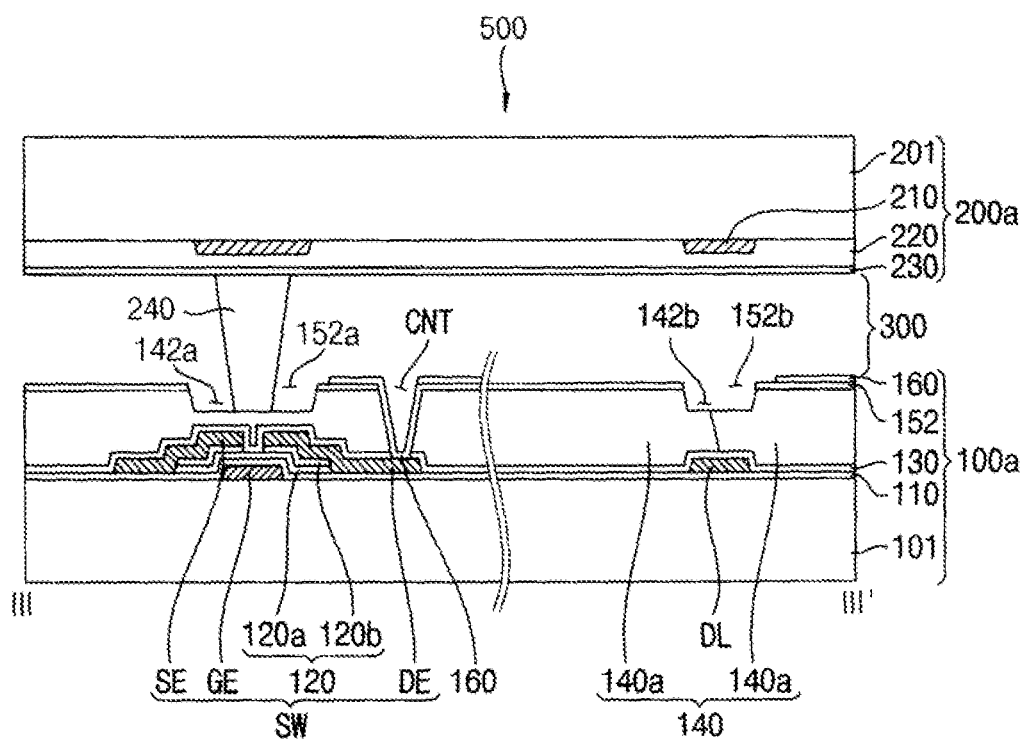
FIG. 10 is a cross-sectional view taken along a line III-III' of FIG. 9.

FIG. 10 is a cross-sectional view taken along a line III-III' of FIG. 9.

Referring to FIGS. 9 and 10, a display panel 500 according to the here illustrated exemplary embodiment, there is provided a first substrate 100a, a second substrate 200a and a liquid crystal layer 300 interposed between the first and second substrates 100a and 200a.

The first substrate 100a may include a first base substrate 101, a gate line GL, a data line DL, a gate insulation layer 110, a switching element SW, a first passivation layer 130, a color filter 140, a second passivation layer 152 and a pixel electrode 160.

The gate line GL extends along a first direction D1. The data line DL extends along a second direction D2 crossing the first direction D1.

The gate insulation layer 110 is formed to cover the gate line GL and a gate electrode GE of the switching element SW.

The switching element SW may be disposed adjacent to an area where the gate line GL and the data line DL are crossed with each other. The switching element SW includes a gate electrode GE, a semiconductor pattern 120, a source electrode SE and a drain electrode DE. The gate electrode GE is electrically connected to the gate line GL. The semiconductor pattern 120 overlaps with the gate electrode GE by interposing the gate insulation layer 110. The semiconductor pattern 120 may include an active layer 120a and an ohmic contact layer 120b. The active layer 120a may include at least one of amorphous silicon (a-Si), crystal silicon and a semiconductive oxide. The ohmic contact layer 120b may include an amorphous silicon (n+a-Si) doped with N type dopants at a high concentration. The source and drain electrodes SE and DE may be disposed on the first semiconductor pattern 120 to be spaced apart from each other.

The passivation layer 130 is formed on the first base substrate 101 on which the source and drain electrodes SE and DE are formed.

The color filter 140 is formed on the first base substrate 101 on which the first passivation layer 130 is formed. The color filter 140 is formed to cover pixel areas R, G and B that are defined on the first base substrate 140. The color filter 140 may include a first color filter 140a, a second color filter 140b and a third color filter 140c. The first color filter 140a may represent green, the second color filter 140b may represent red, and the third color filter 140c may represent blue. Although not shown in FIGS. 9 and 10, the color filter 140 may include more than four colors.

The color filter 140 includes a first recessed portion 142a that is recessed by a predetermined depth dl along a direction of the first base substrate 101. The first recessed portion 142a may be formed on an area corresponding to the switching element SW. The color filter 140 may further include a second recessed portion 142b. The second recessed portion 142b may be formed on an area corresponding to the data line DL. A depth of each of the first and second recessed portions 142a and 142b may be about 6,000 Å.

The second passivation layer 152 is formed on the first base substrate 101 on which the color filter 140 is formed. The second passivation layer 152 may have a first hole 152a and a second hole 152b formed thereon. The first hole 152a is formed on an area corresponding to the first recessed portion 142a, and the second hole 152b is formed on an area corresponding to the second recessed portion 142b.

The pixel electrode 160 is formed on the first base substrate 101 on which the second passivation layer 152 is formed. The pixel electrode 160 is electrically connected to the drain electrode DE of the switching element SW through the contact hole CNT penetrating the second passivation layer 152 and the color filter 140. The pixel electrode 160 may include an electrically conductive and optically transparent material. For example, the pixel electrode 160 may include an indium tin oxide (ITO) and an indium zinc oxide (IZO).

The second substrate 200a may include a second base substrate 201, a black matrix pattern 210, an overcoating layer 224, a common electrode 230 and a spacer 240.

The black matrix pattern 210 is formed on boundary areas of pixel areas defined on the second base substrate 201 to prevent lights from being leaked.

The overcoating layer is formed on the second base substrate 201 on which the black matrix pattern 210 is formed.

The common electrode 230 is formed from an optically transparent and electrically conductive material to be formed on the second base substrate 201 on which the overcoating layer 224 is formed. The common electrode 230 is formed on the second substrate 200a.

The spacer 240 is formed on the common electrode 230. The spacer 240 may be formed on the common electrode 230 corresponding to the first recessed portion 142a. When the first and second substrates 100a and 200a are coupled to each other, the spacer 240 may contact with the first substrate 100a. For example, the spacer 240 may be formed to contact with the first recessed portion 142a exposed by the first hole 152a. The spacer 240 may play a role of maintaining an interval between the first and second substrates 100a and 200a.

The first hole 152a and the first recessed portion 142a may play a role of securing a height of the spacer 240 when the display panel 500 has a low cell gap in order to enhance a response speed of a liquid crystal. Moreover, the second hole 152b and the second recessed portion 142b are formed on an area corresponding to a thick thickness, so that the second hole 152b and the second recessed portion 142b may play a role of decreasing an inner step difference. Thus, a spreading of a liquid crystal is decreased due to the decreasing of the inner step difference, so that it may prevent a smear from being generated.

The first and second holes 152a and 152b may prevent a floating from being generated at a boundary surface between the second passivation layer 152 and the color filter 140, so that it is prevented an error of an active unfilled area ("AUA") from being generated.

Hereinafter, a method of manufacturing the display panel 500 according to the present exemplary embodiment will be described with reference to FIGS. 10 and 11A to 11C.

Firstly, a method of manufacturing the first substrate 100a will be briefly explained.

Figure 11A:
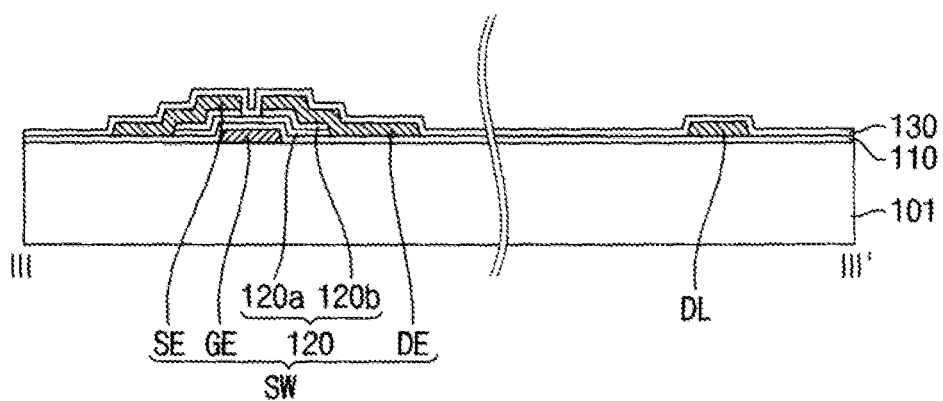

FIGS. 11A to 11C are cross-sectional views explaining a method of manufacturing a first substrate shown in FIG. 10.

Referring to FIGS. 10 and 11A, a gate metal pattern including the gate line GL and the gate electrode GE is formed on the first base substrate 101. A gate metal layer (not shown) is formed on the first base substrate 101, and then the gate metal layer is patterned to form the gate metal pattern. Then, the gate insulation layer 210 is formed on the first base substrate 101 on which the gate metal pattern is formed. The semiconductor pattern 120 is formed on the second base substrate 201 on which the gate insulation layer 110 is formed. An active layer and an ohmic contact layer may be formed on the second base substrate 201, and then the active layer and the ohmic contact layer may be patterned to form the first semiconductor pattern 120. The semiconductor pattern 120 overlaps with the gate electrode GE.

Then, a source metal pattern including the source and drain electrodes SE and DE is formed on the first base substrate 101 on which the semiconductor pattern 120 is formed. A source metal layer is formed on the first base substrate 101 on which the first semiconductor pattern 120 is formed, and then the source metal layer is patterned to form the source metal pattern.

Referring to FIGS. 10 and 11B, the first passivation layer 130 is formed on the first base substrate 101 on which the source metal pattern is formed. The color filter 140 including a first color filter 140a, a second color filter 140b and a third color filter (not shown) is formed on the first base substrate 101 on which the first passivation layer 130 is formed. For example, a first color photoresist layer (not shown) is formed on a whole surface of the first base substrate 101 on which the first passivation layer 130 is formed, and then the first color photoresist layer is patterned to form the first color filter 140a. Then, a second color photoresist layer (not shown) is formed on a whole surface of the first base substrate 101 on which the first color filter 140a is formed, and then the second color photoresist layer is patterned to form the second color filter 140b. Then, a third color photoresist layer (not shown) is formed on a whole surface of the first base substrate 101 on which the first and second color filters 140a and 140b are formed, and then the third color photoresist layer is patterned to form a third color filter adjacent to the second color filter 140b. Then, the first color filter 140a on the drain electrode DE is removed to form the contact hole CNT.

Referring to FIGS. 10 and 11C, the second passivation layer 152 is formed on the first base substrate 101 on which the color filter 140 is formed. Then, a photoresist pattern PR is formed on the first base substrate 101 on which the second passivation layer 152 is formed. A photoresist layer (not shown) is formed on the first base substrate 101 on which the second passivation layer 152 is formed, and then the photoresist layer is exposed and developed by using a mask MA1 to form the photoresist pattern PR. The mask MA1 includes a light-transmitting portion TA transmitting lights and a light-blocking portion BA blocking lights. For example, the photoresist layer corresponding to the light-transmitting portion TA is removed by a develop solution, and the photoresist layer corresponding to the light-blocking portion BA is not removed by the develop solution to be remained on the first base substrate 101.

In the above, it is described that the photoresist layer is formed from a positive photoresist. When a positive photoresist is used as the photoresit layer, portions of the photoresist layer that were not exposed to an electron beam remain, and portions of the photoresist layer that were exposed to an electron beam are removed during a development process. However, it is not limited to that exemplary embodiment. That is, the photoresist layer may be formed from a negative photoresist. When a negative photoresist is used as the photoresit layer, portions of the photoresist layer that were exposed to an electron beam remain, and portions of the photoresist layer that were not exposed to an electron beam are removed during a development process.

A portion of the second passivation layer 152 is removed by using the photoresist pattern PR as an etch masking layer. As the portion of the second passivation layer 152 is removed, the first and second color filters 140a and 140b are exposed.

Figure 11D:
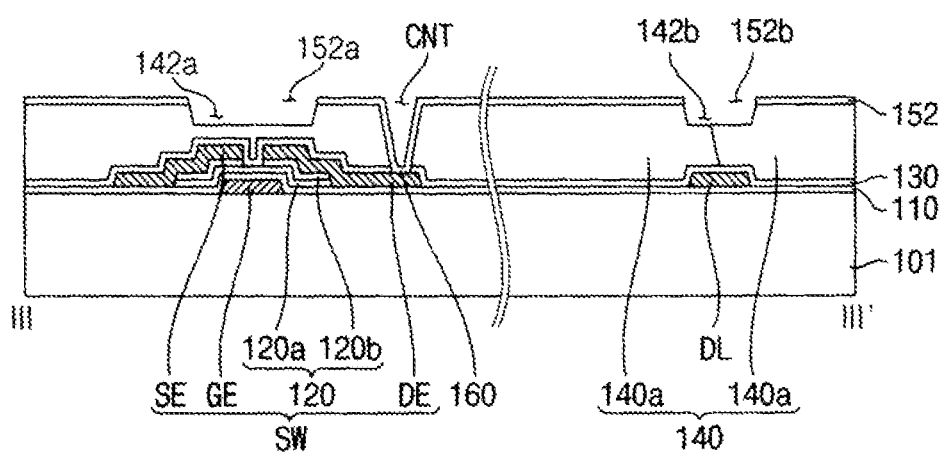

Then, portions of the first and second color filters 140a and 140b are removed by using the photoresist pattern PR and the second passivation layer 152 as an etch stop layer. Then, the photoresist pattern PR is removed. Thus, as shown in FIG. 11D, the first and second recessed portions 142a and 142b are formed in the color filter 140, and the first hole 152a connected to the first recessed portion 142a is formed on through the second passivation layer 152, and the second hole 152b connected to the second recessed portion 142b is formed through the second passivation layer 152. The first recessed portion 142a is formed over the switching element SW, and the second recessed portion 142b is formed on the data line DL.

The pixel electrode 160 electrically connected to the drain electrode DE through the contact hole CNT is formed on the first base substrate 101 on which the second passivation layer 152 is formed. Thus, the first substrate 100a, as shown in FIG. 10, may be manufactured.

The second passivation layer 152 may be omitted. In this case, during a process forming the contact hole CNT by removing the first color filter 140a, the first recessed portion 142a and the contact hole CNT may be simultaneously formed by using a mask (not shown) for forming the contact hole CNT.

Hereinafter, a method of manufacturing the second substrate 200a will be explained with reference to FIG. 10.

Referring to FIG. 10, the black matrix pattern 210 is formed on the second base substrate 201. A black matrix layer is formed on the second base substrate 201, and then the black matrix layer is patterned to form the black matrix pattern 210. For one example, the black matrix layer may be formed by a metal material such as chromium (Cr), a chromium oxide (CrOx). For another example, the black matrix layer may be formed by a light-sensitive organic layer such as a carbon black resin.

Then, the overcoating layer 224 and the common electrode 230 are sequentially formed on the second base substrate 201 on which the black matrix pattern 210 is formed. The spacer 240 is formed on the second base substrate 201 on which the common electrode 230 is formed. A photoresist layer (not shown) may be formed on the second base substrate 201 on which the common electrode 230 is formed, and then the photoresist layer may be patterned to form the spacer 240. Thus, the second substrate 200a may be manufactured.

The first substrate 100a and the second substrate 200a are coupled to each other, so that the spacer 240 is positioned on the first recessed portion 142a. As shown in FIG. 10, the liquid crystal layer 300 is disposed between the first and second substrates 100a and 200a. For example, liquid crystals are dropped on the first substrate 100a, and then the first substrate 100a and the second substrate 200a are coupled to each other to form the liquid crystal layer 300. Alternatively, the first substrate 100a and the second substrate 200a are coupled to each other, and then liquid crystals are injected between the first and second substrates 100a and 200a to form the liquid crystal layer 300.

According to the present exemplary embodiment, when the first and second substrates 100a and 200a are coupled to each other, a height of a color filter corresponding to the spacer 240 is decreased, so that a height of the spacer 240 (and volume of inkjetted material used to form the same) may be increased.

Moreover, a height of an area having a thick thickness thicker than another portion of the first substrate 100a, for example, a height of an area in which the data line DL is formed and a height of an area in which adjacent color filters are overlapped with each other are decreased. Thus, a spreading of liquid crystal is decreased due to the decreasing of the inner step difference, so that it may prevent a smear from being generated.

Figure 12:
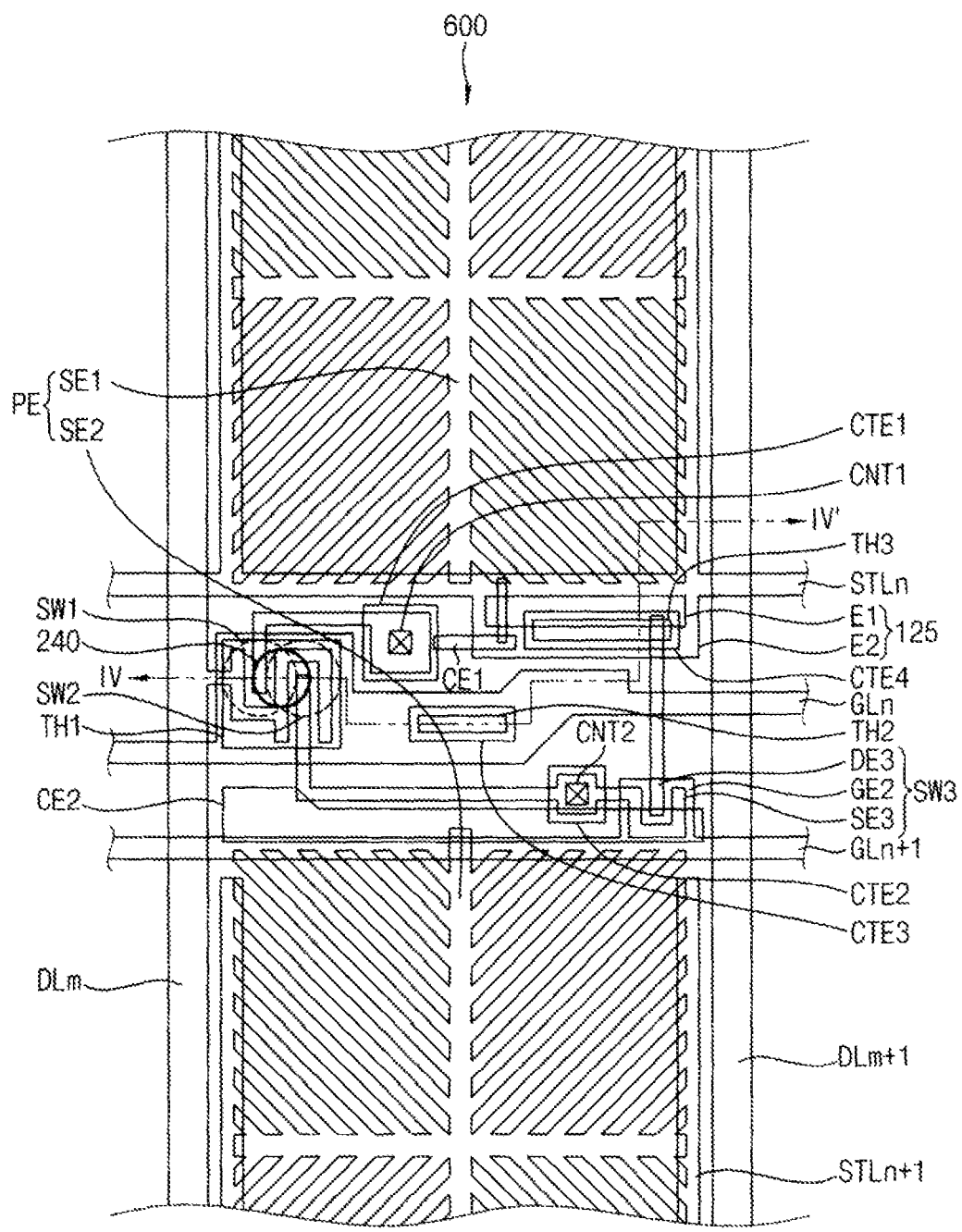
FIG. 12 is a plan view illustrating a display panel according to still another exemplary embodiment.

FIG. 12 is a plan view illustrating a display panel according to still another exemplary embodiment (one having plural switching elements, SW1, SW2, SW3 per cell).

Figure 13:
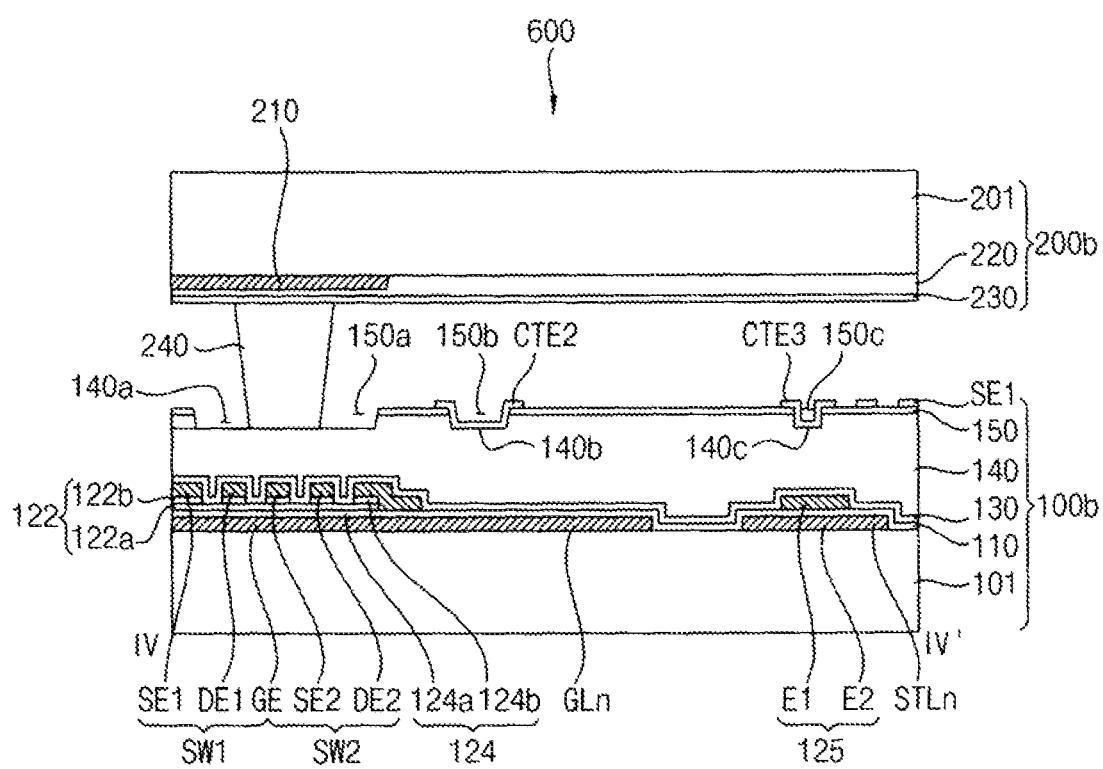
FIG. 13 is a cross-sectional view taken along a line IV-IV' of FIG. 12.

FIG. 13 is a cross-sectional view taken along a line IV-IV' of FIG. 12.

Referring to FIGS. 12 and 13, a display panel 600 may include a first substrate 100b, a second substrate 200b and a liquid crystal layer 300 interposed between the first and second substrates 100b and 200b.

The first substrate 100b may include a first base substrate 101, a plurality of gate lines GLn and GLn+1, a plurality of data lines DLm and DLm+1, a plurality of storage lines STLn and STLn+1, a gate insulation layer 110, a first switching element SW1, a second switching element SW2, a third switching element SW3, a charge down capacitor 125, a first passivation layer 130, a color filter 140, a second passivation layer 152 and a pixel electrode PE. In this case, 'n' and 'm' are natural numbers.

The gate lines GLn and GLn+1 are extended along a first direction D1 to be arranged along a second direction D2 crossing the first direction D1. The data lines DLm and DLm+1 are extended along the second direction D2 to be arranged along the first direction D1. The storage lines STLn and STLn+1 are formed to overlap with a portion of the pixel electrode PE.

The pixel electrode PE includes a first sub-electrode SE1 formed on a first sub-pixel area SPAT and a second sub-electrode SE2 formed on a second sub-pixel area SPA2. An n-th storage line STLn overlaps with a portion of the first sub-electrode SE1, and an (n+1)-th storage line STLn+1 overlaps with a portion of the second sub-electrode SE2.

The gate insulation layer 110 is formed to cover the gate lines GL and gate electrodes GE of the first to third switching elements SW1, SW2 and SW3.

The first switching element SW1 includes a gate electrode SE electrically connected to the n-th gate line GLn, a source electrode SE1 electrically connected to an m-th data line DLm, a drain electrode DE1 electrically connected to the first sub-electrode SE1 and a semiconductor pattern 122. The semiconductor pattern 122 may include an active layer 122a and an ohmic contact layer 122b. The source and drain electrodes SE1 and DE1 are disposed on the semiconductor pattern 122 to be spaced apart from each other. The first switching element SW1 is electrically connected to the first sub-electrode SE1 through a first connection electrode CE1, a first contact electrode CTE1 and a first contact hole CNT1. A first terminal of the first connection electrode CE1 is electrically connected to the first sub-electrode SE1, and a second terminal of the first connection electrode CE1 is electrically connected to the first contact hole CTE1. The first contact electrode CTE1 is electrically connected to the drain electrode DE1 of the first switching element SW1 through the first contact hole CNT1.

The second switching element SW2 may include a gate electrode GE electrically connected to the n-th gate line GLn, a source electrode SE2 electrically connected to the source electrode SE1 of the first switching element SW1, a drain electrode DE2 electrically connected to the third switching element SW3 through a second contact hole CNT2, and a semiconductor pattern 124. The semiconductor pattern 124 may include an active layer 124a and an ohmic contact layer 124b.

The third switching element SW3 may include a gate electrode GE2 electrically connected to the (n+1)-th gate line GLn+1, a source electrode SE3 electrically connected to the drain electrode DE2 of the second switching element SW2, a drain electrode DE3 electrically connected to a first electrode E1 of the charge down capacitor 125, and a semiconductor pattern (not shown). The third switching element SW3 is electrically connected to the second sub-electrode SE2 through a second connection electrode CE2, a second contact electrode CTE2 and the second contact hole CNT2. The second contact electrode CE2 is electrically connected to the second sub-electrode SE2 and the second contact electrode CTE2. The second contact electrode CTE2 is electrically connected to the drain electrode DE2 of the second switching element SW2 and the source electrode SE3 of the third switching element SW3 through the second contact hole CNT2.

The charge down capacitor 125 is defined by the first electrode E1 electrically connected to the drain electrode DE3 of the third switching element SW3, a second electrode E2 electrically connected to the n-th storage line STLn, and the gate insulation layer 110 interposed between the first and second electrodes E1 and E2. The charge down capacitor 125 makes down a voltage applied to the second sub-electrode SE2. For example, the charge down capacitor 125 may play a role of downing electric charge charged in a second liquid crystal capacitor defined by the second sub-electrode SE2 and a common electrode 230 of the second substrate 200b.

The first passivation layer 130 is formed on the first base substrate 101 on which the first to third switching elements SW1, SW2 and SW3 are formed.

The color filter 140 is formed on the first base substrate 101 on which the first passivation layer 130 is formed. The color filter 140 may be one of a red color filter, a green color filter and a blue color filter. The color filter 140 may include a first recessed portion 140a, a second recessed portion 140b and a third recessed portion 140c. The first recessed portion 140a may be formed on an area corresponding to the first and second switching elements SW1 and SW2. The second recessed portion 140b may be formed on an area corresponding to the n-th gate line GLn. The third recessed portion 140c may be formed on an area corresponding to the charge down capacitor 125. For example, the third recessed portion 140c may be formed to overlap with the first and second electrodes E1 and E2 of the charge down capacitor 125 and a portion of the drain electrode DE3 of the third switching element SW3.

The second passivation layer 152 is formed on the first base substrate 101 on which the color filter 140 is formed. The second passivation layer 152 may include a first hole 150a, a second hole 150b and a third hole 150c. The first hole 150a may be formed on an area corresponding to the first recessed portion 140a, the second hole 150b may be formed on an area corresponding to the second recessed portion 140b, and the third hole 150c may be formed on an area corresponding to the third recessed portion 140c.

The first recessed portion 140a and the first hole 150a may define a first through hole TH1, the second recessed portion 140b and the second hole 150b may define a second through hole TH2, and the third recessed portion 140c and the third hole 150c may define a third through hole TH3. The first to third through holes TH1, TH2 and TH3 may prevent a floating from being generated at a boundary surface between the second passivation layer 152 and the color filter 140, so that it is prevented an error of an active unfilled area ("AUA") from being generated. That is, when the display panel 600 is manufactured, gas gathered below the first passivation layer 130 or the second passivation layer 152 is spurted at once due to external impacts so that the AUA may be generated. However, when the first to third through holes TH1, TH2 and TH3 are formed in accordance with the present exemplary embodiment, thereby releasing the gas generated from the color filter 140 during an outgasing process. Thus, the floating generated at the boundary surface between the second passivation layer 152 and the color filter 140 may be prevented, so that it may be prevented the AUA from being generated. Alternatively, the second through hole TH2 and the third through hole TH3 may be omitted.

As described in FIG. 11C, a photoresist pattern (not shown) is formed on the first base substrate 101 on which the second passivation layer 152 is formed, and then the first to third recessed portions 140a, 140b and 140c and the first to third holes 150a, 150b and 150c may be formed by using the photoresist pattern as an etch stop layer. For example, a portion of the second passivation layer 152 is removed by using the photoresist pattern as an etch stop layer. Then, a portion of the color filter 140 is removed by using the photoresist pattern and the second passivation layer 152 as an etch stop layer. Accordingly, as shown in FIG. 13, the first to third recessed portions 140a, 140b and 140c are formed on the color filter 140. Moreover, the first hole 150a connected to the first recessed portion 140a, the second hole 150b connected to the second recessed portion 140b and the third hole 150c connected to the third recessed portion 140c are formed on the second passivation layer 152.

The pixel electrode PE is formed on the first base substrate 101 on which the second passivation layer 152 is formed. The pixel electrode PE may include an electrically conductive and optically transparent material. For example, the pixel electrode PE may include an indium tin oxide (ITO) and an indium zinc oxide (IZO). The pixel electrode PE includes the first sub-electrode SE1 and the second sub-electrode SE2.

The first substrate 100b may further include a third contact electrode CTE3 and a fourth contact electrode CTE4. The third contact electrode CTE3 is formed to cover the second hole 150b to protect the second recessed portion 140b exposed by the second hole 150b. The fourth contact electrode CTE4 is formed to cover the third hole 150c to protect the third recessed portion 140c exposed by the third hole 150c. The first to fourth contact electrodes CTE1, CTE2, CTE3 and CTE4 may include an optically transparent and electrically conductive material such as the pixel electrode PE.

The second substrate 200a may include a second base substrate 201, a black matrix pattern 210, an overcoating layer 224, a common electrode 230 and a spacer 240.

The black matrix pattern 210 is formed on boundary areas of pixel areas defined on the second base substrate 201 to prevent lights from being leaked.

The overcoating layer is formed on the second base substrate 201 on which the black matrix pattern 210 is formed.

The common electrode 230 is formed from an optically transparent and electrically conductive material to be formed on the second base substrate 201 on which the overcoating layer 224 is formed. The common electrode 230 is formed on the second substrate 200b.

The spacer 240 is formed on the common electrode 230. The spacer 240 may be formed on the common electrode 230 corresponding to the first recessed portion 140a. When the first and second substrates 100b and 200b are coupled to each other, the spacer 240 may contact with the first substrate 100b. For example, the spacer 240 may be formed to contact with the first recessed portion 140a exposed by the first hole 150a. The spacer 240 may play a role of maintaining an interval between the first and second substrates 100b and 200b. The spacer 240 may be spaced apart from the first substrate 100b by a predetermined distance. In this case, the spacer 240 may secure a margin of a liquid crystal injecting process or maintain a tolerance for a pressure applied from an external side.

Figure 14:
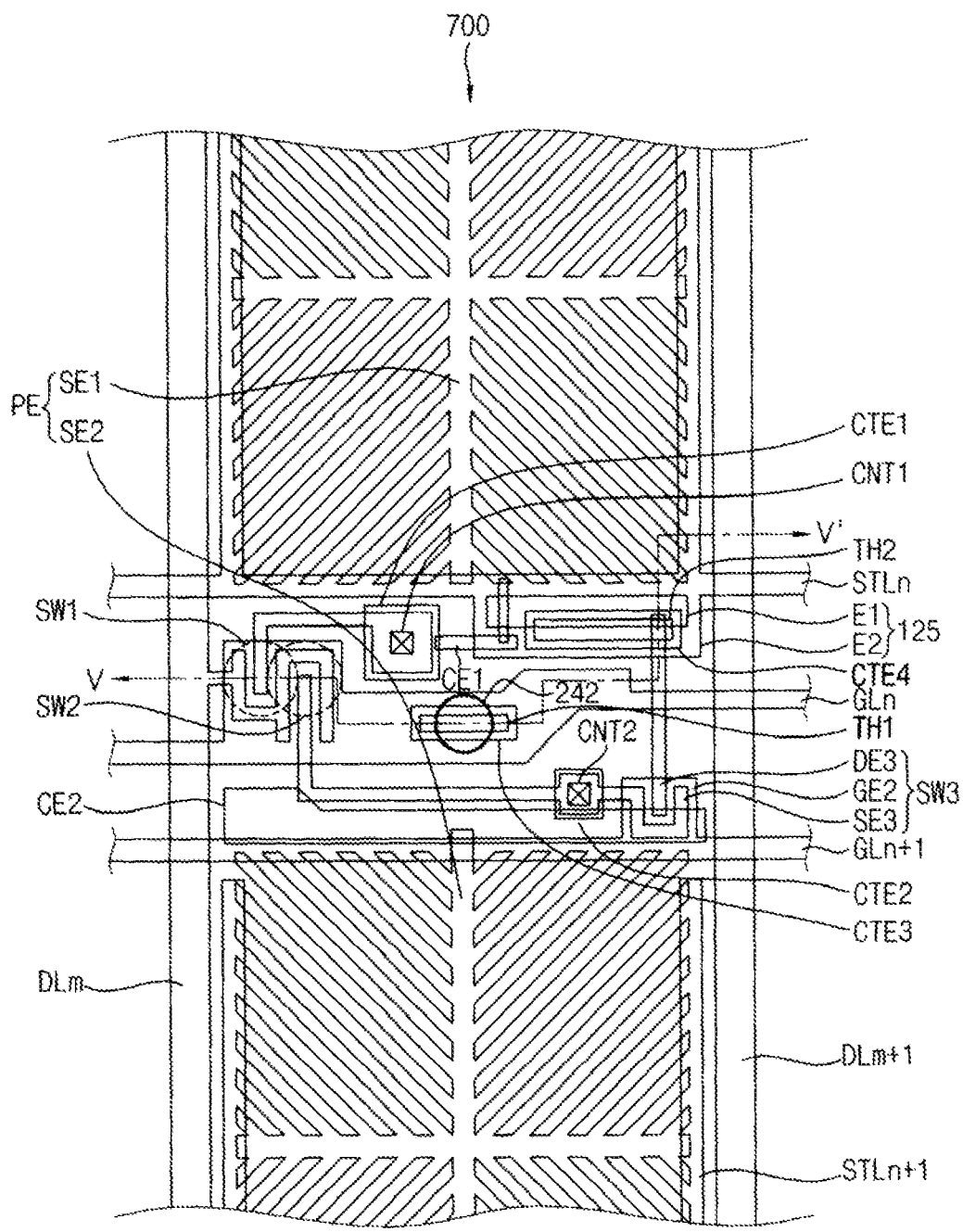
FIG. 14 is a plan view illustrating a display panel according to still another exemplary embodiment.

FIG. 14 is a plan view illustrating a display panel according to still another exemplary embodiment.

Figure 15:
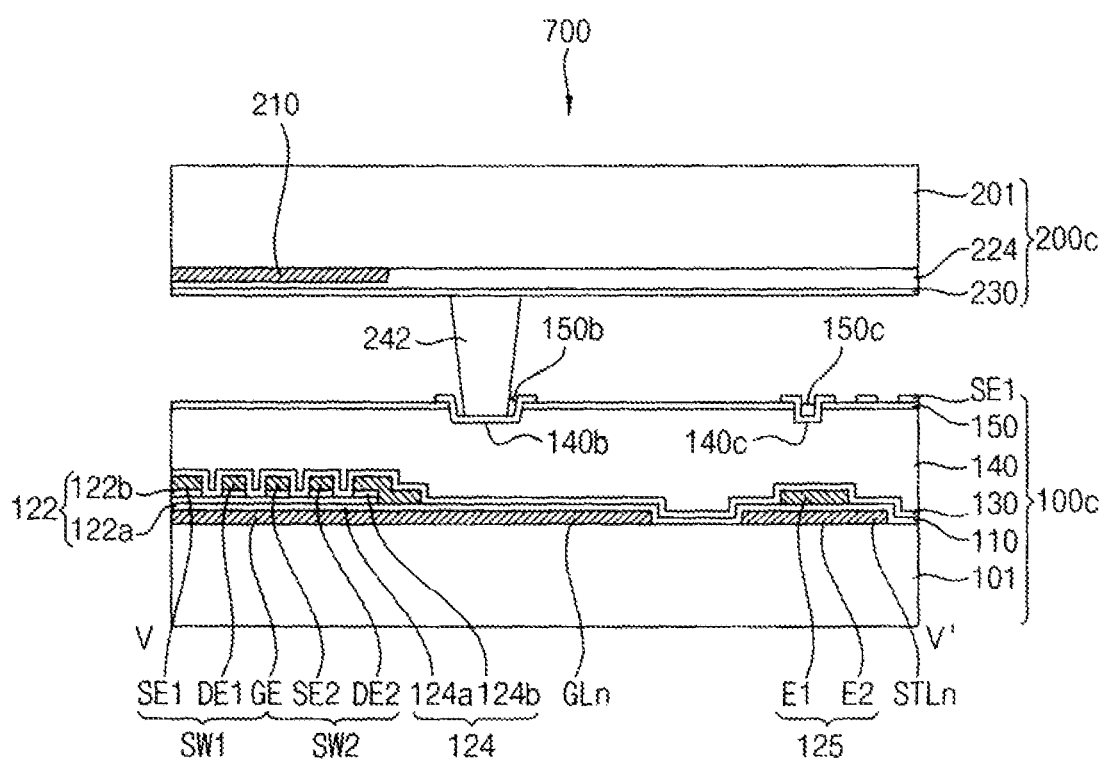
FIG. 15 is a cross-sectional view taken along a line V-V' of FIG. 14.

FIG. 15 is a cross-sectional view taken along a line V-V' of FIG. 14.

Referring to FIGS. 14 and 15, a display panel 700 according to the present exemplary embodiment of the present invention may include a first substrate 100a, a second substrate 200b, and a liquid crystal layer 300 disposed between the first and second substrates 100c and 200c. The display panel 700 according to the present exemplary embodiment is substantially the same as the display panel 600 of FIGS. 12 and 13 except for positions of a color filter 140 and a second passivation layer 152 of the first substrate 100c and a spacer 242 of the second substrate 200c. Thus, identical reference numerals are used in FIGS. 14 and 15 to refer to components that are the same or like those shown in FIGS. 12 and 13, and thus a detailed description thereof will be omitted.

The first substrate 100c may include a first base substrate 101, a plurality of gate lines GLn and GLn+1, a plurality of data lines DLm and DLm+1, a plurality of storage lines STLn and STLn+1, a gate insulation layer 110, a first switching element SW1, a second switching element SW2, a third switching element SW3, a charge down capacitor 125, a first passivation layer 130, a color filter 140, a second passivation layer 152 and a pixel electrode PE. In this case, 'n' and 'm' are natural numbers.

The color filter 140 is formed on the first base substrate 101 on which the first passivation layer 130 is formed. The color filter 140 may be one of a red color filter, a green color filter and a blue color filter. The color filter 140 may include a first recessed portion 140b and a second recessed portion 140c. The first recessed portion 140b may be formed on an area corresponding to an n-th gate line GLn. The second recessed portion 140c may be formed on an area corresponding to the charge down capacitor 125. For example, the second recessed portion 140c may be formed to overlap with the first and second electrodes E1 and E2 of the charge down capacitor 125 and a portion of a drain electrode DE3 of the third switching element SW3.

The second passivation layer 152 is formed on the first base substrate 101 on which the color filter 140 is formed. The second passivation layer 152 may include a first hole 150b and a second hole 150c. The first hole 150b may be formed on an area corresponding to the first recessed portion 140b, and the second hole 150c may be formed on an area corresponding to the second recessed portion 140c.

The first recessed portion 140b and the first hole 150b may define a first through hole TH1, and the second recessed portion 140c and the second hole 150c may define a second through hole TH2. The first and second through holes TH1 and TH2 may prevent a floating from being generated at a boundary surface between the second passivation layer 152 and the color filter 140, so that it is prevented an error of an active unfilled area ("AUA") from being generated. Alternatively, the second through hole TH2 may be omitted.

The second substrate 200a may include a second base substrate 201, a black matrix pattern 210, an overcoating layer 224, a common electrode 230 and a spacer 242.

The spacer 242 is formed on the common electrode 230. The spacer 242 may be formed on the common electrode 230 corresponding to the first recessed portion 140b. The spacer 242 may be formed to contact with the first recessed portion

140b exposed by the first hole 150b. Alternatively, the spacer 242 may be spaced apart from the first recessed portion 140b by a predetermined distance.

Although not shown in a drawing, the spacer 242 may be formed on an area corresponding to the second recessed portion 140c.

As described above, according to exemplary embodiments of the present disclosure of invention, a spacer is formed on the dummy color filter, so that an amount of photoresist for forming the spacer is decreased but a uniformity of the effective spacer height may be enhanced.

Alternatively or additionally a recessed portion is formed through an area in which a switching element is formed and the spacer is disposed on the recessed portion, so that a height of the spacer is secured so that it may prevent a smear from being generated due to a varying of a cell gap. Particularly, although the display panel has a low cell gap so as to drive the display panel in a high speed, a height of the spacer may be suitably maintained, so that a uniformity of the spacer may be realized and a margin of liquid crystal may be secured.

The foregoing is illustrative of the present teachings and is not to be construed as limiting thereof. Although a few example embodiments have been described, those skilled in the art will readily appreciate from the foregoing that many modifications are possible in the example embodiments without materially departing from the novel teachings and advantages of the present disclosure. Accordingly, all such modifications are intended to be included within the scope of the present teachings. In the claims, means-plus-function clauses are intended to cover the structures described herein as performing the recited function and not only structural equivalents but also functionally equivalent structures. Therefore, it is to be understood that the foregoing is illustrative of the present disclosure and is not to be construed as limited to the specific example embodiments disclosed, and that modifications to the disclosed example embodiments, as well as other example embodiments, are intended to be included within the scope of the present teachings.

What is claimed is:

1. A display panel comprising:
   a first substrate having a plurality of predefined pixel areas;
   a second substrate spaced apart from and disposed above the first substrate, the second substrate comprising:
      a base substrate having a base surface facing the first substrate and an opposed other major surface farther away from the first substrate;
      a black matrix pattern formed on the base surface so as to include a light-blocking section corresponding to and vertically overlapping a non-aperture portion of a corresponding one of the predefined pixel areas, the light-blocking section being formed to have, adjacent thereto, an adjacent opening portion of the black matrix pattern that is vertically aligned in correspondence with an aperture portion of the corresponding one of the predefined pixel areas of the first substrate;
      a color filter formed in the opening portion of the black matrix pattern and having a respective first thickness (T1);
   a dummy color filter formed to consist of a same material as that of the color filter and to have a respective second thickness (T2) extending vertically from the light-blocking section toward the first substrate, the dummy color filter additionally being disposed proximate to the color filter but having a dummy width dimension substantially narrower than a same directed width dimension of the proximate color filter, the black matrix pattern having a recessed portion formed therein at an area thereof where the dummy color filter is formed; and
   a common electrode formed to extend conformably along surfaces of the color filter and of the dummy color filter, which surfaces face the first substrate; and
   a spacer formed on the dummy color filter, to vertically overlap the dummy color filter and to thereby, as a result of the overlap, define a spacing between the light-blocking section of the second substrate and the non-aperture portion of the corresponding pixel area of the first substrate, the spacer being formed on an area corresponding to the recessed portion.

2. The display panel of claim 1, wherein
   the spacer is formed to extend from the common electrode toward the non-aperture portion of the corresponding pixel area.

3. The display panel of claim 1, wherein
   the aperture portion of the corresponding pixel area is surrounded by the dummy color filter when viewed in a top plan view;
   the dummy color filter extends beyond the corresponding pixel area;
   the spacer has a substantially circular shape when viewed in the top plan view; and
   the extending-beyond portion of the dummy color filter has a width no more than about 70% of a diameter of the substantially circular shape of the spacer.

4. The display panel of claim 1, wherein the second thickness of the dummy color filter is substantially equal to the first thickness of the color filter.

5. A display panel comprising:
   a first substrate having a plurality of predefined pixel areas;
   a second substrate spaced apart from and disposed above the first substrate, the second substrate comprising:
      a base substrate having a base surface facing the first substrate and an opposed other major surface farther away from the first substrate;
      a black matrix pattern formed on the base surface so as to include a light-blocking section corresponding to and vertically overlapping a non-aperture portion of a corresponding one of the predefined pixel areas, the light-blocking section being formed to have, adjacent thereto, an adjacent opening portion of the black matrix pattern that is vertically aligned in correspondence with an aperture portion of the corresponding one of the predefined pixel areas of the first substrate;
      a color filter formed in the opening portion of the black matrix pattern and having a respective first thickness (T1);
   a dummy color filter formed to consist of a same material as that of the color filter and to have a respective second thickness (T2) extending vertically from the light-blocking section toward the first substrate, wherein the second thickness (T2) of the dummy color filter is substantially thinner than the first thickness (T1) of the color filter, the dummy color filter additionally being disposed proximate to the color filter but having a dummy width dimension substantially narrower than a same directed width dimension of the proximate color filter; and
   a common electrode formed to extend conformably along surfaces of the color filter and of the dummy color filter, which surfaces face the first substrate; and
   a spacer formed on the dummy color filter, to vertically overlap the dummy color filter and to thereby, as a result of the overlap, define a spacing between the light-blocking section of the second substrate and the non-aperture portion of the corresponding pixel area of the first substrate.

* * * * *